United States Patent
Subbarayan et al.

(10) Patent No.: US 11,783,033 B2
(45) Date of Patent: Oct. 10, 2023

(54) METHODS AND APPARATUS FOR ANALYZING SEQUENCES OF APPLICATION PROGRAMMING INTERFACE TRAFFIC TO IDENTIFY POTENTIAL MALICIOUS ACTIONS

(71) Applicant: Ping Identity Corporation, Denver, CO (US)

(72) Inventors: Udayakumar Subbarayan, Bangalore (IN); Bernard Harguindeguy, Atherton, CA (US); Isidore Rosenblum, Pleasanton, CA (US); Yasar Kundottil, Bangalore (IN); Aditya Gunuganti, Hyderabad (IN); Amit Kumar Sharma, Bangalore (IN); Avinash Kumar Sahu, Bangalore (IN)

(73) Assignee: Ping Identity Corporation, Denver, CO (US)

( * ) Notice: Subject to any disclaimer, the term of this patent is extended or adjusted under 35 U.S.C. 154(b) by 0 days.

(21) Appl. No.: 17/680,767

(22) Filed: Feb. 25, 2022

(65) Prior Publication Data
US 2022/0292190 A1    Sep. 15, 2022

Related U.S. Application Data

(63) Continuation of application No. 16/909,272, filed on Jun. 23, 2020, now Pat. No. 11,263,321, which is a
(Continued)

(30) Foreign Application Priority Data
Oct. 13, 2017 (IN) .............................. 201711036534

(51) Int. Cl.
*G06F 9/54* (2006.01)
*G06F 21/55* (2013.01)
(Continued)

(52) U.S. Cl.
CPC .............. *G06F 21/554* (2013.01); *G06F 9/54* (2013.01); *G06F 21/552* (2013.01);
(Continued)

(58) Field of Classification Search
CPC ....................................................... G06F 9/541
(Continued)

(56) References Cited

U.S. PATENT DOCUMENTS 6,336,117 B1    1/2002   Massarani
7,209,962 B2    4/2007   Boden
(Continued)

FOREIGN PATENT DOCUMENTS

EP    2715540 A1    4/2014
EP    3678348 A1    7/2020
(Continued)

OTHER PUBLICATIONS

Extended European Search Report for European Application No. 22157218.3, dated May 13, 2022, 11 pages.
(Continued)

*Primary Examiner* — Andy Ho
(74) *Attorney, Agent, or Firm* — COOLEY LLP

(57) ABSTRACT

In some embodiments, a method includes receiving, at a processor of a server, a first application programming interface (API) call from a client device and providing an indication associated with the first API call as an input to a machine learning model such that the machine learning model identifies a set of parameters associated with a set of likely subsequent API calls. The method can further include receiving a second API call from the client device, identifying the second API call as an anomalous API call based on the second API call not meeting the set of parameters
(Continued)

associated with the set of likely subsequent API calls, and sending a signal to perform a remedial action based on the identifying.

20 Claims, 6 Drawing Sheets

Related U.S. Application Data continuation of application No. 16/158,836, filed on Oct. 12, 2018, now Pat. No. 10,699,010.

(51) Int. Cl.
*G06N 20/00* (2019.01)
*H04L 9/40* (2022.01)
*H04L 41/16* (2022.01)
*H04L 41/14* (2022.01)
*H04L 41/147* (2022.01)
*G06F 21/56* (2013.01)
*G06F 40/216* (2020.01)

(52) U.S. Cl.
CPC .......... *G06F 21/566* (2013.01); *G06F 40/216* (2020.01); *G06N 20/00* (2019.01); *H04L 41/145* (2013.01); *H04L 41/147* (2013.01); *H04L 41/16* (2013.01); *H04L 63/1425* (2013.01); *H04L 63/1441* (2013.01)

(58) Field of Classification Search
USPC ........................................................ 719/328
See application file for complete search history.

(56) References Cited

U.S. PATENT DOCUMENTS

| | | |
|---|---|---|
| 7,716,274 B1 | 5/2010 | Kumar |
| 7,743,089 B2 | 6/2010 | Putzolu |
| 8,339,959 B1 | 12/2012 | Moisand et al. |
| 8,892,665 B1 | 11/2014 | Rostami-Hesarsorkh et al. |
| 8,949,828 B2 | 2/2015 | Pafumi et al. |
| 8,973,088 B1 | 3/2015 | Leung et al. |
| 8,990,942 B2 | 3/2015 | Thakadu et al. |
| 9,305,328 B2 | 4/2016 | Mahajan et al. |
| 9,307,017 B2 | 4/2016 | Wang et al. |
| 9,413,560 B2 | 8/2016 | Patil et al. |
| 9,443,079 B2 | 9/2016 | Reierson et al. |
| 9,516,053 B1 | 12/2016 | Muddu et al. |
| 9,537,756 B2 | 1/2017 | Bahadur et al. |
| 9,773,112 B1 | 9/2017 | Rathor et al. |
| 9,935,829 B1 | 4/2018 | Miller et al. |
| 9,948,703 B2 | 4/2018 | Olivier et al. |
| 10,025,873 B2 | 7/2018 | Jackson et al. |
| 10,038,742 B2 | 7/2018 | Reddy et al. |
| 10,193,867 B2 | 1/2019 | Subbarayan et al. |
| 10,484,337 B2 | 11/2019 | Subbarayan et al. |
| 10,511,574 B2 | 12/2019 | Poliashenko et al. |
| 10,587,580 B2 | 3/2020 | Subbarayan et al. |
| 10,666,621 B2 | 5/2020 | Subbarayan et al. |
| 10,681,012 B2 | 6/2020 | Subbarayan et al. |
| 10,699,010 B2 | 6/2020 | Subbarayan et al. |
| 10,701,037 B2 | 6/2020 | Subbarayan et al. |
| 10,726,491 B1 | 7/2020 | Hockey et al. |
| 10,834,054 B2 | 11/2020 | Subbarayan et al. |
| 10,909,241 B2 | 2/2021 | Puri et al. |
| 11,075,885 B2 | 7/2021 | Subbarayan et al. |
| 11,140,135 B2 | 10/2021 | Subbarayan et al. |
| 11,263,321 B2 | 3/2022 | Subbarayan et al. |
| 11,272,026 B2 | 3/2022 | Walsh et al. |
| 11,272,036 B2 | 3/2022 | Li |
| 11,336,661 B2 | 5/2022 | Boulton |
| 11,411,923 B2 | 8/2022 | Subbarayan et al. |
| 11,496,475 B2 | 11/2022 | Harguindeguy et al. |
| 11,582,199 B2 | 2/2023 | Subbarayan et al. |
| 2001/0039586 A1 | 11/2001 | Primak et al. |
| 2002/0112189 A1 | 8/2002 | Syvanne et al. |
| 2003/0110172 A1 | 6/2003 | Selman et al. |
| 2005/0015471 A1 | 1/2005 | Zhang et al. |
| 2005/0027862 A1 | 2/2005 | Nguyen et al. |
| 2005/0165902 A1 | 7/2005 | Hellenthal et al. |
| 2005/0249199 A1 | 11/2005 | Albert et al. |
| 2006/0159082 A1 | 7/2006 | Cook et al. |
| 2006/0184661 A1 | 8/2006 | Weisman et al. |
| 2006/0248294 A1 | 11/2006 | Nedved et al. |
| 2007/0156919 A1 | 7/2007 | Potti et al. |
| 2007/0165622 A1 | 7/2007 | O'Rourke et al. |
| 2007/0192506 A1 | 8/2007 | Gupta et al. |
| 2007/0282979 A1 | 12/2007 | Tuel |
| 2008/0016339 A1 | 1/2008 | Shukla |
| 2008/0263654 A1 | 10/2008 | Bahl et al. |
| 2008/0276234 A1 | 11/2008 | Taylor et al. |
| 2008/0320582 A1 | 12/2008 | Chen et al. |
| 2009/0040926 A1 | 2/2009 | Li et al. |
| 2009/0067440 A1 | 3/2009 | Chadda et al. |
| 2009/0235067 A1 | 9/2009 | Miller et al. |
| 2009/0327459 A1 | 12/2009 | Yoo et al. |
| 2010/0333111 A1 | 12/2010 | Kothamasu et al. |
| 2011/0119374 A1 | 5/2011 | Ruhl et al. |
| 2011/0145842 A1 | 6/2011 | Tofighbakhsh et al. |
| 2011/0295957 A1 | 12/2011 | Ananthanarayanan et al. |
| 2012/0054131 A1 | 3/2012 | Williamson |
| 2012/0059939 A1 | 3/2012 | Chandrasekaran et al. |
| 2012/0110603 A1 | 5/2012 | Kaneko et al. |
| 2012/0131639 A1 | 5/2012 | Alex et al. |
| 2012/0179819 A1 | 7/2012 | Hanson et al. |
| 2012/0226820 A1 | 9/2012 | Li et al. |
| 2012/0233668 A1 | 9/2012 | Leafe et al. |
| 2012/0290511 A1 | 11/2012 | Frank et al. |
| 2012/0304244 A1 | 11/2012 | Xie et al. |
| 2013/0031403 A1 | 1/2013 | Mordani et al. |
| 2013/0044764 A1 | 2/2013 | Casado et al. |
| 2013/0054822 A1 | 2/2013 | Mordani et al. |
| 2013/0179947 A1 | 7/2013 | Kline, III et al. |
| 2013/0205028 A1 | 8/2013 | Crockett et al. |
| 2013/0227091 A1 | 8/2013 | Tompkins |
| 2013/0339548 A1 | 12/2013 | Gopinath et al. |
| 2014/0012966 A1 | 1/2014 | Baphna et al. |
| 2014/0019626 A1 | 1/2014 | Hubler et al. |
| 2014/0025986 A1 | 1/2014 | Kalyanaraman et al. |
| 2014/0059226 A1 | 2/2014 | Messerli et al. |
| 2014/0149590 A1 | 5/2014 | Mallipeddi et al. |
| 2014/0149605 A1 | 5/2014 | Annamalaisami et al. |
| 2014/0156836 A1 | 6/2014 | Demmer et al. |
| 2014/0237594 A1 | 8/2014 | Thakadu et al. |
| 2014/0258771 A1 | 9/2014 | Xie et al. |
| 2014/0280595 A1 | 9/2014 | Mani et al. |
| 2014/0280988 A1 | 9/2014 | Reynolds et al. |
| 2014/0304352 A1 | 10/2014 | Chaudhary et al. |
| 2014/0337268 A1 | 11/2014 | Bhattacharya et al. |
| 2014/0344326 A1 | 11/2014 | Kamath et al. |
| 2014/0362681 A1 | 12/2014 | Bahadur et al. |
| 2014/0380087 A1 | 12/2014 | Jamjoom et al. |
| 2015/0026794 A1 | 1/2015 | Zuk et al. |
| 2015/0095887 A1 | 4/2015 | Bhattacharya |
| 2015/0128103 A1 | 5/2015 | Stratton et al. |
| 2015/0128274 A1 | 5/2015 | Giokas |
| 2015/0161390 A1 | 6/2015 | Xuan |
| 2015/0180894 A1 | 6/2015 | Sadovsky et al. |
| 2015/0188760 A1 | 7/2015 | Anumala et al. |
| 2015/0188808 A1 | 7/2015 | Ghanwani et al. |
| 2015/0220376 A1 | 8/2015 | Srivastava |
| 2015/0229579 A1 | 8/2015 | Kosim-Satyaputra et al. |
| 2015/0234639 A1 | 8/2015 | Allsbrook |
| 2015/0312102 A1 | 10/2015 | Backholm et al. |
| 2015/0319136 A1 | 11/2015 | Xie et al. |
| 2015/0319226 A1 | 11/2015 | Mahmood |
| 2015/0358344 A1 | 12/2015 | Mumcuoglu et al. |
| 2015/0372938 A1 | 12/2015 | Patel et al. |
| 2016/0011732 A1 | 1/2016 | Yang |
| 2016/0036862 A1 | 2/2016 | Bagepalli et al. |
| 2016/0057173 A1 | 2/2016 | Singman et al. |
| 2016/0065672 A1 | 3/2016 | Savage et al. |
| 2016/0088023 A1 | 3/2016 | Handa et al. |

(56) References Cited

U.S. PATENT DOCUMENTS

| | | |
|---|---|---|
| 2016/0092297 A1 | 3/2016 | Mazon et al. |
| 2016/0098265 A1 | 4/2016 | Mahajan et al. |
| 2016/0205519 A1 | 7/2016 | Patel et al. |
| 2016/0234168 A1 | 8/2016 | Leung et al. |
| 2016/0248812 A1 | 8/2016 | Desai et al. |
| 2016/0308721 A1 | 10/2016 | Dellisanti et al. |
| 2016/0308900 A1 | 10/2016 | Sadika et al. |
| 2016/0337474 A1 | 11/2016 | Rao |
| 2016/0352588 A1 | 12/2016 | Subbarayan et al. |
| 2016/0352867 A1 | 12/2016 | Subbarayan et al. |
| 2016/0366155 A1 | 12/2016 | El-Moussa et al. |
| 2017/0012941 A1 | 1/2017 | Subbarayan et al. |
| 2017/0097941 A1 | 4/2017 | Graves, Jr. et al. |
| 2017/0142100 A1 | 5/2017 | Bollay et al. |
| 2017/0220798 A1 | 8/2017 | Madou et al. |
| 2017/0289307 A1 | 10/2017 | Thompson et al. |
| 2017/0302535 A1 | 10/2017 | Lee |
| 2017/0308446 A1 | 10/2017 | Kanso |
| 2017/0310708 A1 | 10/2017 | Schiappa et al. |
| 2018/0027115 A1 | 1/2018 | Kamboh et al. |
| 2018/0046475 A1* | 2/2018 | Wei .................... G06F 9/44552 |
| 2018/0109610 A1 | 4/2018 | Einkauf et al. |
| 2018/0115523 A1 | 4/2018 | Subbarayan et al. |
| 2018/0115578 A1 | 4/2018 | Subbarayan et al. |
| 2018/0173557 A1 | 6/2018 | Nakil et al. |
| 2018/0183823 A1 | 6/2018 | Fadlil et al. |
| 2018/0278635 A1* | 9/2018 | Shin ........................ H04L 45/64 |
| 2018/0285095 A1 | 10/2018 | Aw et al. |
| 2018/0337891 A1 | 11/2018 | Subbarayan et al. |
| 2018/0337892 A1 | 11/2018 | Subbarayan et al. |
| 2018/0337893 A1 | 11/2018 | Subbarayan et al. |
| 2018/0337894 A1 | 11/2018 | Subbarayan et al. |
| 2018/0367433 A1 | 12/2018 | Luna et al. |
| 2019/0005576 A1 | 1/2019 | Mick et al. |
| 2019/0020722 A1 | 1/2019 | Haraszti et al. |
| 2019/0034199 A1 | 1/2019 | Pollock |
| 2019/0114417 A1 | 4/2019 | Subbarayan et al. |
| 2019/0245876 A1 | 8/2019 | Faigon et al. |
| 2019/0258473 A1 | 8/2019 | Vishnepolsky et al. |
| 2020/0162433 A1 | 5/2020 | Subbarayan et al. |
| 2020/0177556 A1 | 6/2020 | Subbarayan et al. |
| 2020/0220875 A1 | 7/2020 | Harguindeguy et al. |
| 2020/0304470 A1 | 9/2020 | Subbarayan et al. |
| 2020/0336467 A1 | 10/2020 | Subbarayan et al. |
| 2021/0004460 A1 | 1/2021 | Subbarayan et al. |
| 2022/0021656 A1 | 1/2022 | Subbarayan et al. |
| 2022/0045990 A1 | 2/2022 | Subbarayan et al. |
| 2022/0217176 A1 | 7/2022 | Holloway et al. |
| 2022/0263708 A1 | 8/2022 | Ramachandran et al. |
| 2023/0061142 A1 | 3/2023 | Subbarayan et al. |

FOREIGN PATENT DOCUMENTS

| | | |
|---|---|---|
| WO | WO-2012162102 A1 | 11/2012 |
| WO | WO-2016168368 A1 | 10/2016 |

OTHER PUBLICATIONS

Office Action for U.S. Appl. No. 16/881,376, dated Jun. 24, 2022, 8 pages.
Bashar, A., "Autonomic scaling of cloud computing resources using BN-based prediction models," 2013 IEEE 2nd International Conference on Cloud Networking (CloudNet): Short Paper, IEEE, 2013, pp. 200-204.
Extended European Search Report for European Application No. 18200235.2, dated Feb. 11, 2019, 9 pages.
Extended European Search Report for European Application No. 20150237.4, dated May 27, 2020, 13 pages.
Ghaffarian, S. M. et al., "Software vulnerability analysis and discovery using machine-learning and data-mining techniques: A Survey," ACM Computing Surveys, vol. 50, No. 4, Article 56, pp. 1-36 (Aug. 2017).
Hachinyan, O., "Detection of Malicious Software Based on Multiple Equations of API-call Sequences," Feb. 2017, IEEE, pp. 415-418.
Lu, S. et al., "Elastic scaling of virtual clusters in cloud data center networks," 2017 IEEE 36th International Performance Computing and Communications Conference (IPCCC), IEEE, 2017, 8 pages.
Niu, D. et al., "Quality-assured cloud bandwidth auto-scaling for video-on-demand applications," 2012 Proceedings IEEE INFOCOM, 9 pages.
Office Action for European Application No. 18200235.2, dated Jan. 30, 2020, 7 pages.
Office Action for European Application No. 18200235.2, dated Sep. 14, 2020, 8 pages.
Office Action for European Application No. 20150237.4, dated Apr. 13, 2021, 10 pages.
Office Action for U.S. Appl. No. 15/164,512, dated Aug. 15, 2019, 16 pages.
Office Action for U.S. Appl. No. 15/164,512, dated Feb. 28, 2019, 18 pages.
Office Action for U.S. Appl. No. 15/164,512, dated Jul. 6, 2018, 9 pages.
Office Action for U.S. Appl. No. 15/164,555, dated Jan. 9, 2019, 19 pages.
Office Action for U.S. Appl. No. 15/164,555, dated Oct. 24, 2019, 24 pages.
Office Action for U.S. Appl. No. 15/164,587, dated Feb. 22, 2018, 17 pages.
Office Action for U.S. Appl. No. 15/792,850, dated Aug. 8, 2019, 9 pages.
Office Action for U.S. Appl. No. 15/793,671, dated Jul. 8, 2019, 36 pages.
Office Action for U.S. Appl. No. 16/050,915, dated Sep. 6, 2019, 18 pages.
Office Action for U.S. Appl. No. 16/050,958, dated Dec. 31, 2018, 7 pages.
Office Action for U.S. Appl. No. 16/050,996, dated Nov. 16, 2018, 6 pages.
Office Action for U.S. Appl. No. 16/051,026, dated Dec. 13, 2018, 6 pages.
Office Action for U.S. Appl. No. 16/158,836, dated Nov. 18, 2019, 13 pages.
Office Action for U.S. Appl. No. 16/733,570, dated Sep. 21, 2021, 15 pages.
Office Action for U.S. Appl. No. 16/788,059, dated Oct. 19, 2020, 6 pages.
Office Action for U.S. Appl. No. 16/909,272, dated Jun. 24, 2021, 10 pages.
Wikipedia: "Honeypot (computing)," Sep. 2007 (Sep. 1, 2007), XP007917443, Retrieved from the Internet: URL:http://en.wikipedia.org/w/index.php?title=Honeypot_(computing)&oldid=159801521, [retrieved on Mar. 3, 2011], 12 pages.
Xu, J et al,. "Lightweight and Adaptive Service API Performance Monitoring in Highly Dynamic Cloud Environment," 2017 IEEE International Conference on Services Computing (SCC), 2017, pp. 35-43.
Office Action for U.S. Appl. No. 17/817,577 dated Apr. 12, 2023, 9 pages.
Uppal, D., et al., "Malware detection and classification based on extraction of API sequences," 2014 International Conference on Advances in Computing, Communications and Informatics (ICACCI), Delhi, India, 2014, pp. 2337-2342, doi: 10.1109/ICACCI.2014.6968547.
Wei, S., et al., "Mining network traffic for application category recognition on Android platform," 2015 IEEE International Conference on Progress in Informatics and Computing (PIC), Nanjing, China, 2015, pp. 409-413, doi: 10.1109/PIC.2015.7489879.

* cited by examiner

METHODS AND APPARATUS FOR ANALYZING SEQUENCES OF APPLICATION PROGRAMMING INTERFACE TRAFFIC TO IDENTIFY POTENTIAL MALICIOUS ACTIONS

CROSS-REFERENCE TO RELATED APPLICATIONS

This application is a continuation of U.S. patent application Ser. No. 16/909,272, filed Jun. 23, 2020, titled "Methods and Apparatus for Analyzing Sequences of Application Programming Interface Traffic to Identify Potential Malicious Actions", now U.S. Pat. No. 11,263,321, which is a continuation of U.S. patent application Ser. No. 16/158,836, filed Oct. 12, 2018, titled "Methods and Apparatus for Analyzing Sequences of Application Programming Interface Traffic to Identify Potential Malicious Actions", now U.S. Pat. No. 10,699,010, which claims priority to and the benefit of Indian Patent Application No. 201711036534, filed Oct. 13, 2017 and titled "Multi-Level Sequencing Outlier Detection System And API Deception Environment For Layer 7 API Traffic Security Using Deep Learning Artificial Intelligence," each of which is incorporated herein by reference in its entirety.

BACKGROUND

The embodiments described herein relate to methods and apparatus for analyzing API traffic to identify potential malicious actions within a smart outlier detection system.

Application Programming Interfaces or APIs allow software applications to communicate with each other so that users and programs can use the applications to accomplish any number of tasks such as information gathering, social communication, e-commerce transactions, accessing entertainment, educational content, etc. APIs can include a set of subroutine definitions, communication protocols, and other tools for building and managing software applications and interactions between components of the software applications. In an instance where a user requests a service or a function of a software application, the request can be transmitted to an API in the form of an API request or an API call. Logins, saves, queries, and other instructions are examples of operations counted as API requests among other types of operations. The API calls can lead to performing one or more of the desired functions and may return any queried information.

It is important to implement security measures in transactions mediated through API traffic. Driven by the rapid increase in mobile and Internet-of-Things (IoT) devices, APIs and micro-services are increasingly used to make business logic and data more accessible to users. APIs, however, can make it easier for malicious users and programs to access business applications, control systems, and databases. Thus, a need exists for improved apparatuses and methods for effective monitoring and analysis of API traffic to identify and/or thwart potential malicious actions.

SUMMARY

In some embodiments, an apparatus includes a non-transitory processor-readable medium storing code representing instructions to be executed by a processor. The code comprises code to cause the processor to receive, from a client device, a set of application programming interface (API) calls having a sequence. The code includes code to cause the processor to provide an indication associated with at least one API call from the set of API calls as an input to a machine learning model to identify a predicted sequence of API calls associated with the at least one API call. The code further includes code to cause the processor to calculate a consistency score for each pair of API calls from the set of API calls by comparing (1) a proximity within the sequence of a first API call in that pair of API calls to a second API call in that pair of API calls and (2) a proximity within the predicted sequence of the first API call in that pair of API calls to the second API call in that pair of API calls. The code further causes the processor to identify, based on the consistency score for each pair of API calls from the set of API calls that the client device is operating in a malicious manner; and restrict API calls received from the client device based on identifying that the client device is operating in the malicious manner.

In some embodiments, a method includes receiving, at a processor of a server, a first application programming interface (API) call from a client device. The method includes providing an indication associated with the first API call as an input to a machine learning model such that the machine learning model identifies a set of parameters associated with a set of likely subsequent API calls. The method further includes receiving a second API call from the client device, identifying the second API call as an anomalous API call based on the second API call not meeting the set of parameters associated with the set of likely subsequent API calls, and sending a signal to perform a remedial action based on the identifying.

In some embodiments, an apparatus includes a memory and a processor. The processor is configured to receive a first set of application programming interface (API) calls before a first time. The processor is configured to train, using the first set of API calls, a machine learning model to predict sequences of API calls. The processor is further configured to receive a second set of API calls at a second time after the first time, the second set of API calls having a sequence. The processor is configured to provide an indication associated with at least one API call from the second set of API calls as an input to the machine learning model to identify a predicted sequence of API calls associated with the at least one API call. The processor is further configured to identify, based on a comparison between the predicted sequence and the sequence of the second set of API calls, that the second set of API calls is indicative of maliciousness. The processor is configured to send a signal to implement a remedial action based on the second set of API calls being indicative of maliciousness.

DETAILED DESCRIPTION

Figure 1A:
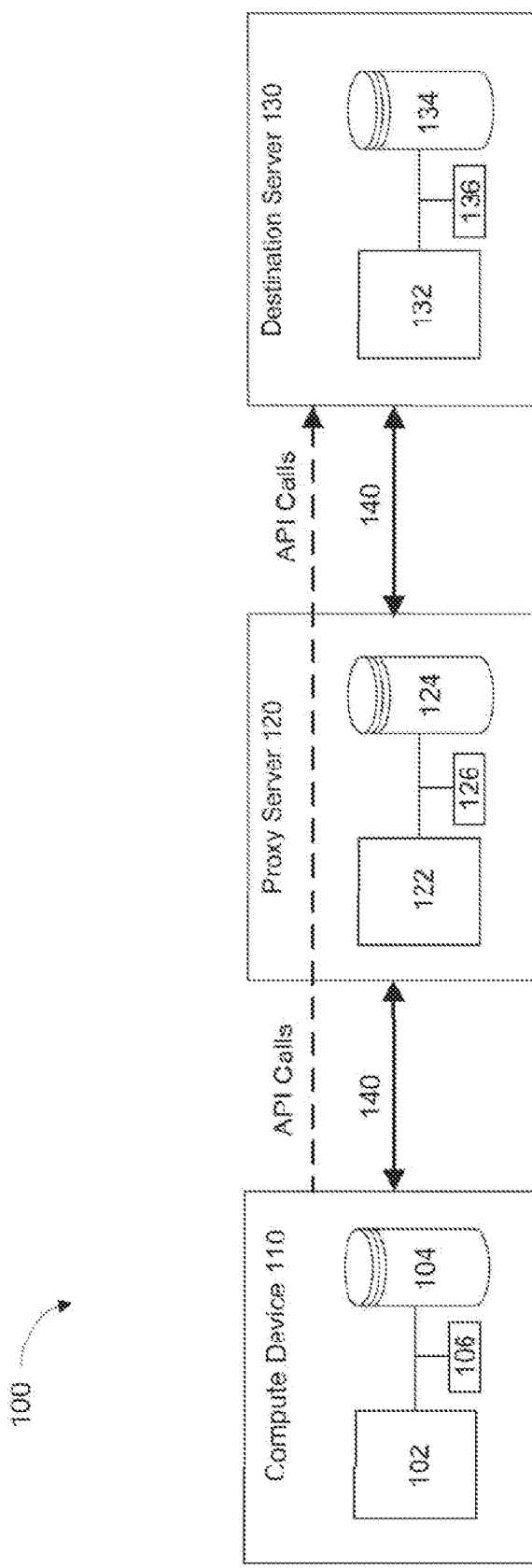
FIG. 1A is a schematic illustration of an outlier detection (OD) system, according to an embodiment.

FIG. 1A is a schematic illustration of an Outlier Detection system 100, also referred to herein as "an OD system" or "a system". The OD system 100 includes a compute device 110 connected, via a Proxy Server 120, to a Destination Server 130 through a communication network 140, as illustrated in FIG. 1A. The OD system 100 is configured to manage application programming interface (API) traffic originating from a compute device 110 and directed to a Destination Server 130. The Outlier Detection system 100 routes the API traffic via a Proxy Server 120 acting as an API gateway device. While the system 100 is illustrated to include one compute device 110 and one destination server 130, a similar OD system can include any number of compute devices and any number of destination servers.

The compute device 110 can be any suitable hardware-based computing device and/or a multimedia device, such as, for example, a server, a desktop compute device, a smartphone, a tablet, a wearable device, a laptop and/or the like. The compute device 110 can include a processor 102, a memory 104, and a communicator 106.

The processor 102 of the compute device 110 can be, for example, a hardware-based integrated circuit (IC) or any other suitable processing device configured to run and/or execute a set of instructions or code. For example, the processor 102 can be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 102 can be operatively coupled to the memory 104 through a system bus (for example, address bus, data bus and/or control bus).

The processor 102 is configured to run an operating system supporting execution of one or more software applications having API support. For example API-based web applications, distributed applications and client server applications can be configured to use one or more security gateways (including servers, virtual machines and Linux containers) interposed between client compute devices and destination servers for security at the API layer. The processor 102 can be configured to generate suitable API calls directed to the destination server 104 to use the one or more software applications running on the processor 102. In some instances, the processor 102 can generate a set of API calls such that each API call from the set of API calls is associated with a user, or an organization, or a software application or a client device. The API calls can be generated based on the function of the used software application. For example, the processor 102 can be configured to generate an API call or API request to fetch data used for a logging-in function associated with a web application that is being executed by the processor 102.

In some instances, the API calls generated and sent to a destination server can all be associated with a single application. In some other instances, the processor 102 may be running several applications and the API calls generated and sent to a destination server may be associated with a plurality of the several applications. In some instances, the API calls generated can be sent to a single destination server.

In some other instances, the processor 102 can generate a sequence of API calls such that a first API call is sent to one destination server and a second API call of the sequence of API calls can be sent to a second destination server different from the first destination server, and so on.

In some instances, the processor 102 can be configured to generate the API calls in consideration of the type of operating system that is running on the processor 102 (e.g., Mac OS, Linux, Windows, etc.). The processor 102 can configure the API calls to be directed to the destination server 130 by the communicator 106 via the communication network 140.

The memory 104 of the compute device 110 can be, for example, a random access memory (RAM), a memory buffer, a hard drive, a read-only memory (ROM), an erasable programmable read-only memory (EPROM), and/or the like. The memory 104 can store, for example, one or more software modules and/or code that can include instructions to cause the processor 102 to perform one or more processes, functions, and/or the like (e.g., the execution of one or more software applications, the generation of API calls directed to a destination server, the receiving of information from the destination server, etc.). In some embodiments, the memory 104 can include extendable storage units that can be added and used incrementally. In some implementations, the memory 104 can be a portable memory (for example, a flash drive, a portable hard disk, and/or the like) that can be operatively coupled to the processor 102. In other instances, the memory can be remotely operatively coupled with the compute device. For example, a remote database server can serve as a memory and be operatively coupled to the compute device.

The communicator 106 can be a hardware device operatively coupled to the processor 102 and memory 104 and/or software stored in the memory 104 executed by the processor 102. The communicator 106 can be, for example, a network interface card (NIC), a Wi-Fi™ module, a Bluetooth® module and/or any other suitable wired and/or wireless communication device. The communicator 106 can include or be part of a switch, a router, a hub and/or any other network device. The communicator 106 can be configured to connect the compute device 110 to the communication network 140 (or any suitable communication network). In some instances, the communicator 106 can be configured to connect to a communication network such as, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof.

In some instances, the communicator 106 can facilitate sending, via the communication network 140, a set of API calls to a destination server 130, the API calls being configured to perform suitable functions (e.g., fetching data, etc.) used during operating a software application at the compute device 110. The communicator 106 can also be configured to facilitate receiving data or information and/or a set of files through the communication network 140. In some instances, the set of API calls to be sent can be generated by the processor 102 and/or stored in the memory 104 as described herein. In some instances, the communicator 106 can also be configured to receive data from a remote source such as the destination server 130 that can be used to perform one or more functions by a software application (e.g., an e-commerce application or a banking application using API support) running on the processor 102.

As described above, while FIG. 1A illustrates a single compute device 110 running client-side applications with a single processor 102, memory 104 and communicator 106, in other implementations the OD system 100 can include several compute devices. The compute devices can each include multiple processors, memory units and/or communicators. Some embodiments of the OD system can include several compute device similar to the compute device 110. The compute devices can be configured to send API calls to the several destination server 130 via the proxy server 120 (or via multiple proxy servers).

The OD system 100 illustrated in FIG. 1A includes the destination server 130. The destination server 130 can include a processor 132, a memory 134, and a communicator 136. The processor 132 can be a hardware based integrated circuit (IC) or any other suitable processing device configured to run and/or execute a set of instructions or code. For example, the processor 132 can be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 132 can be operatively coupled to the memory 134 through a system bus (for example, address bus, data bus and/or control bus) (not shown).

The processor 132 can be configured to host APIs that may be called on to support the functioning of one or more software applications executed on client devices such as the compute device 110. In some instances, the processor 132 of the destination server 130 can be configured to host one or more web servers with a specified functionality. The web servers can include or access programs executed on the processor 132, the programs being configured to receive requests from client devices such as the compute device 110 and using specific protocols (e.g., Hypertext Transfer Protocol HTTP, HHTPS, etc.) and to serve information and/or files, in response to the requests. The information and/or files can be forwarded to the client devices such as compute device 110 and be used to perform desired functions at the compute device 110 such as form web pages, run business applications, initiate and complete e-commerce transactions, etc. As an example, the processor 132 can be configured to run server-side APIs or SAPIs (e.g., the Internet Server Application Programming Interface (ISAPI), Netscape Server Application Programming Interface (NSAPI)) that can be serve as modules for software applications to interface with the web servers. Some example web-servers can be the Apache® HTTP Server, Microsoft® IIS, and Oracle® iPlanet Web Server. In some instances, the processor 132 can provide a SAPI to help software developers to extend the capabilities of a web server.

The destination server 130 includes a memory 134, which can be, for example, a random access memory (RAM), a memory buffer, a hard drive, a read-only memory (ROM), an erasable programmable read-only memory (EPROM), and/or the like. The memory 134 can store, for example, one or more software modules and/or code that can include instructions to cause the processor 132 to perform one or more processes, functions, and/or the like (e.g., hosting a web server, providing a server API, receiving API calls directed from compute device 110 over communication network 140, responding to the API calls, etc.). In some embodiments, the memory 134 can include extendable storage units that can be added and used incrementally. In some implementations, the memory 134 can be a portable memory (for example, a flash drive, a portable hard disk, and/or the like) that can be operatively coupled to the processor 132. In other instances, the memory can be remotely operatively coupled with the compute device 110. For example, a remote database server can serve as a memory and be operatively coupled to the compute device 110.

The communicator 136 can be a hardware device operatively coupled to the processor 132 and memory 134 and/or software stored in the memory 134 executed by the processor 132. The communicator 136 can be, for example, a network interface card (NIC), a Wi-Fi™ module, a Bluetooth® module and/or any other suitable wired and/or wireless communication device. The communicator 136 can include or be part of a switch, a router, a hub and/or any other network device. The communicator 136 can be configured to connect the destination server 130 to the communication network 140. In some instances, the communicator 136 can be configured to connect to communication network 140 such as, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof.

The communicator 136 can facilitate receiving a sequence of API calls. In some instances, the communicator 136 can facilitate sending information sent by a SAPI hosted by the destination server 130, in response to the API calls, through the communication network 140. In some instances, a received file or API call can be processed by the processor 132 and/or stored in the memory 134 as described herein.

As described above with reference to the compute device 110, while FIG. 1A illustrates a single destination server 130 with a single processor 132, memory 134 and communicator 136, in other embodiments the OD system 100 can include several destination servers. The destination servers can include multiple processors, memory units and communicators. In some embodiments, an OD system can include several compute devices and several destination serves such that the compute devices are configured to send API calls directed to one or more of the several destination servers via the proxy server 120 (or via multiple proxy servers).

The OD system 100 includes a proxy server 120 through which the API calls directed to the destination server 130 and originating from the compute device 110 are routed, as shown by the dashed arrow in FIG. 1A. While the schematic in FIG. 1A illustrates a single proxy server 120, in some embodiments, an OD system can include multiple proxy servers. For example, the OD system can include a cluster of proxies being interconnected in an overlay network. For example, in some embodiments an OD system can include several compute devices sending API calls and receiving information to and from multiple destination servers, the communications between the compute devices and the destination servers being routed through the multiple proxy servers. The proxy server 120 can include a processor 122, a memory 124, and a communicator 126.

Figure 1B:
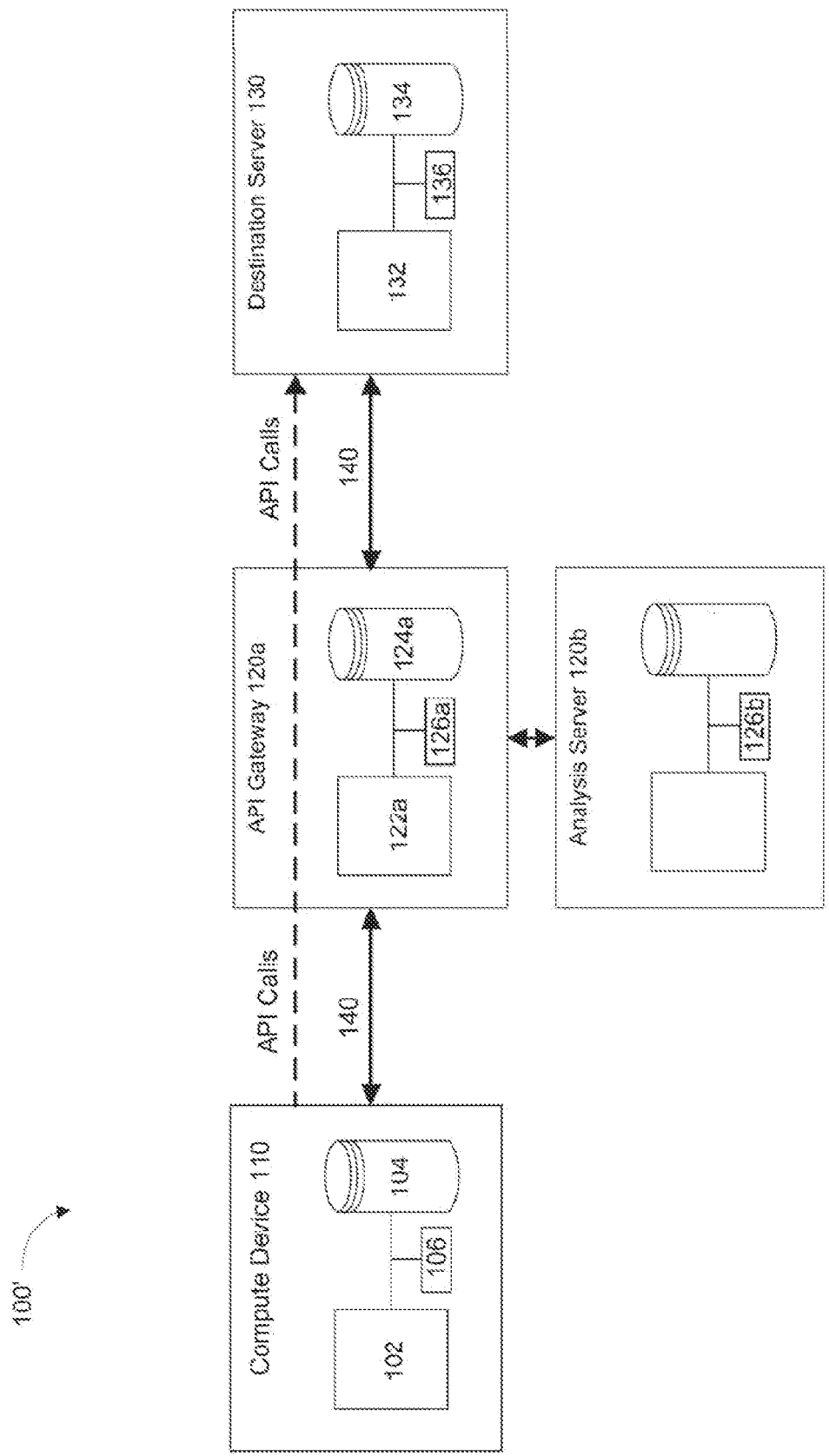
FIG. 1B is a schematic illustration of an outlier detection (OD) system, according to another embodiment.

FIG. 1B is a schematic illustration of an Outlier Detection system 100', according to an embodiment. The OD system 100' can be substantially similar, in structure and/or function to the OD system 100 described above, except for the configuration of the API gateway 120a and the Analysis Server 120b. The OD system 100' includes the compute device 110 connected, via an API gateway 120a, to the Destination Server 130 through the communication network 140, as described with reference to the OD system 100 illustrated in FIG. 1A. In other words, the OD system 100' can include two devices, the API gateway 120a and the Analysis Server 120b, as illustrated in FIG. 1B, that can be configured to perform functions analogous to the Proxy server 120 of the OD system 100 in FIG. 1A.

The API Gateway 120a can be configured to receive and route API traffic from the user device 110 to the destination server 130, and route a copy of the API traffic information to the Analysis server 120b, as indicated in FIG. 1B. The API gateway 120a includes a processor 122a, a memory 124a, and a communicator 126a. The processor 122a, the memory 124a, and the communicator 126a of the API gateway 120a can be similar to the processor 120, the memory 124, and the communicator 126, respectively, of the Proxy server 120 in the OD system 100.

The Analysis Server 120b can be configured to be operatively coupled to the API Gateway 120a and receive information related to API traffic being routed through the API Gateway 120a. The Analysis Server 120b can be configured to perform various analyses on the information related to the API traffic, as described in further detail herein, to identify outliers in API calls included in the API traffic that may be indicative of potentially malicious actions. The Analysis Server 120b includes a processor 122b, a memory 124b, and a communicator 126b, as shown in FIG. 1B. The processor 122b, the memory 124b, and the communicator 126b of the Analysis Server 120b can be substantially similar to the processor 120, the memory 124, and the communicator 126, respectively, of the Proxy server 120 in the OD system 100.

Figure 2:
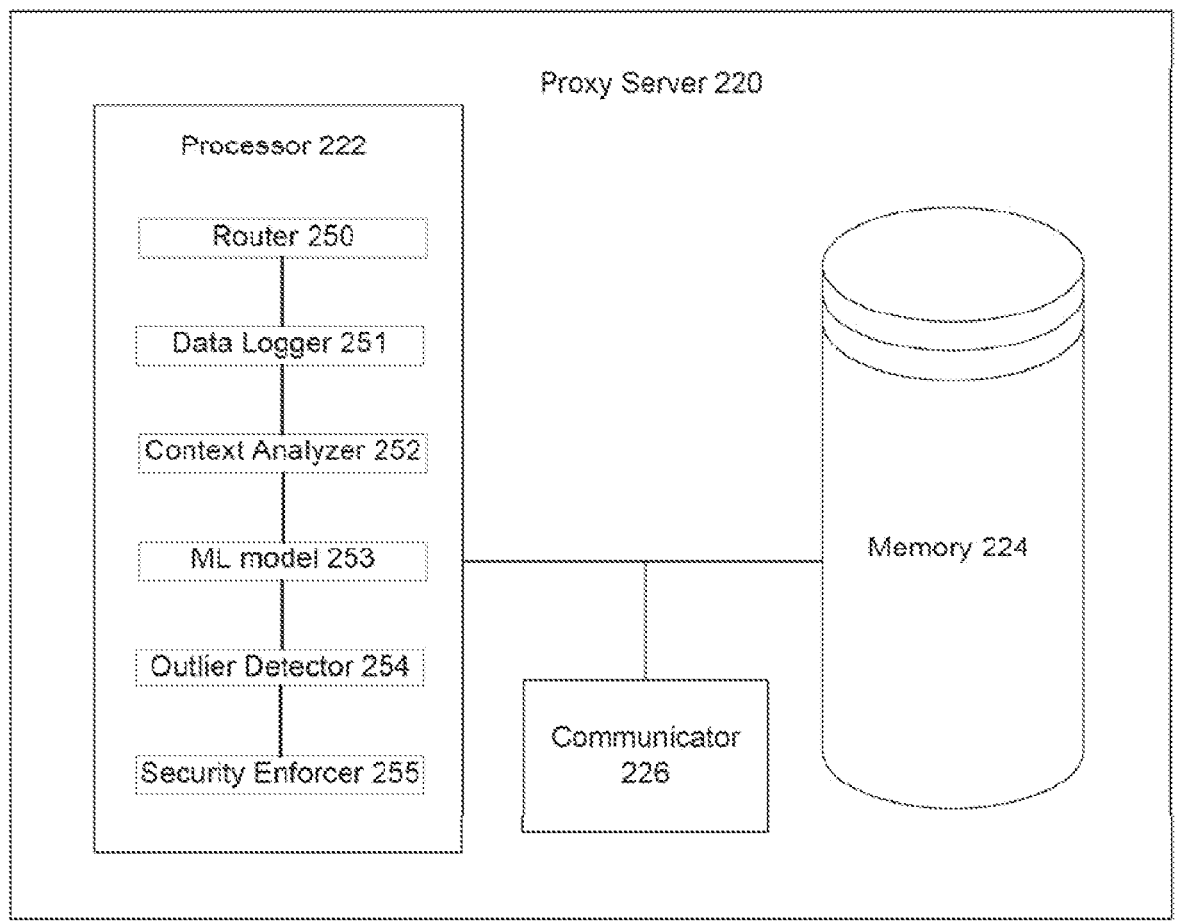
FIG. 2 is a schematic representation of a proxy server within an OD system, according to an embodiment.

FIG. 2 is a schematic block diagram of an example proxy server 220 that can be part of an OD system similar to the OD system 100 illustrated in FIG. 1A. The proxy server 220 can be substantially similar in structure and/or function to the proxy server 120 of the OD system 100 in FIG. 1A. While the proxy server 220 is shown as a single device included in an OD system, in some embodiments an OD system can include two devices that together may be configured to perform the functions of the proxy server 220. For example, in some embodiments, an OD system may include an API gateway configured to route API traffic between client or compute devices and destination server and route a copy of the API traffic information to an Analysis server that may perform various analyses to detect outliers in the API traffic information to identify potentially malicious actions, as described with reference to the OD system 100' in FIG. 1B.

The proxy server 220 can be a hardware-based computing device and/or a multimedia device, such as, for example, a server, a desktop compute device, a tablet, a laptop and/or the like. The proxy server 220 can be configured to act as an intermediary and serve as a gateway device between compute devices that may be part of a local network and destination servers that may be part of a larger scale network (e.g., the Internet). In some instances, the proxy server 220 can be an open web proxy server, serving as a gateway or a tunneling proxy. In some instances the proxy server 220 can be configured to serve as a forward proxy that faces a larger network, used to retrieve information from a wide range of sources that can be destinations servers. In some instances, the proxy server 220 can be configured to act as a reverse proxy, which can be a proxy server facing an internal or local network, also being configured to perform tasks such as load balancing, authentication, decryption, and/or caching of information accessed by users within the internal network.

In some instances, the proxy server 220 can be configured as a full proxy, a half proxy, a security proxies or an Internet-of-Things (IOT) proxy.

The proxy server 220 can be configured to manage transmission and routing of the transmission information or data between compute devices and destination servers. For example, a client application running on a compute device can connect to the proxy server 220, requesting a service, such as a file, connection, web page, or other resource available from a destination server. The proxy server can evaluate the request as a way to simplify and control its complexity. In some instances, the proxy server 220 can pass on the request to the appropriate destination server. In some instances, the proxy server 220 can be configured to control the flow of information as well as analyze the information being transferred to and from the destination server via the traffic that the proxy server 220 routes. For example the proxy server 220 can not only direct data but also allow or restrict the flow of data to or from selected compute devices or destination servers. In some instances, the proxy server 220 can be used to support encapsulation of the data communications transmitted between the compute devices and the destination servers, where encapsulation in network communications can include methods of using modular communication protocols in which logically separate functions in the network are abstracted from their underlying structures by inclusion of information hiding within higher level objects. In some embodiments, the proxy server 220 can be configured to identify anomalies, threats and/or attacks through implementation of machine-learning-based API traffic analyses, as described in further detail herein. The proxy server 220 includes a processor 222, a memory 224 (e.g., including data storage), and a communicator 226. As described previously, while the proxy server 220 is described as a single device, in some embodiments an OD system can include two or more devices, for example an API gateway and an Analysis Server (similar to the OD system 100' described above with respect to FIG. 1B). The API gateway and the Analysis Server can each include a processor, a memory and a communicator. In such embodiments, the various components of the processor 222 described below can be distributed between the two devices. For example, the router and data logger may be included in the API gateway while the context analyzer, the ML model, the outlier detector, and the security enforcer may be included in the Analysis Server.

The memory 224 of the proxy server 220 can be, for example, a random access memory (RAM), a memory buffer, a hard drive, a read-only memory (ROM), an erasable programmable read-only memory (EPROM), and/or the like. The memory 224 can store, for example, one or more software modules and/or code that can include instructions to cause the processor 222 to perform and/or implement one or more processes, functions, and/or the like associated with the one or more units described herein (e.g., the router 250, the data logger 251, the context analyzer 252, the ML model 253, the outlier detector 254, and the security enforcer 255). In some embodiments, the memory 224 can include extendable storage units that can be added and used incrementally. In some implementations, the memory 224 can be a portable memory (for example, a flash drive, a portable hard disk, and/or the like) that can be operatively coupled to the processor 222. In other instances, the memory can be remotely operatively coupled with the proxy server. For example, a remote database server can serve as a memory and be operatively coupled to the proxy server 220.

The communicator 226 can be a hardware device operatively coupled to the processor 222 and memory 224 and/or software stored in the memory 224 executed by the processor 222. The communicator 226 can be, for example, a network interface card (NIC), a Wi-Fi™ module, a Bluetooth® module and/or any other suitable wired and/or wireless communication device. Furthermore the communicator 226 can include a switch, a router, a hub and/or any other network device. The communicator 226 can be configured to connect the proxy server 220 to a communication network (such as the communication network 140 shown in FIG. 1A). In some instances, the communicator 226 can be configured to connect to a communication network such as, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof.

In some instances, the communicator 226 can facilitate receiving requests of information such as API calls from one or more compute devices such as the compute device 110 of the OD system 100 in FIG. 1A, through a communication network (e.g. the communication network 140 illustrated in FIG. 1A). The communicator 226 can facilitate directing the requests or API calls to one or more destination servers such as the destination server 130 of the OD system 100 described above, via the communication network. In some instances, a received request for a file or information from the one or more compute devices can be processed by the processor 222 and/or stored in the memory 224 as described in further detail herein. In some instances, as described previously, the communicator 226 can include communication ports configured to route the flow of information from specific compute devices and/or to specific destination servers. The ports can be physical and/or logical constructs (e.g., stored in the memory 224 and implemented by the processor 222) that may be associated with specific communication protocols and/or communication addresses. In some instances, the communicator 226 can control the receiving and/or sending of data from or to specific destination servers. In some instances, for example, the communicator 226 can block or restrictedly permit communication between a specific set of compute devices and a specific set of destination servers. In some instances, the communicator 226 can facilitate sending of information from the proxy server 220 to one or more compute devices or destination servers (e.g., alerts, error messages, etc.). The communicator 226 can also be configured to send data collected and analyzed by the processor 222 of the proxy server 220 and the results of any analyses to a compute device or destination server or a third party device (not shown in FIG. 1A) but may be included in an OD system according to some embodiments.

The proxy server 220 includes the processor 222, which can be, for example, a hardware based integrated circuit (IC) or any other suitable processing device configured to run and/or execute a set of instructions or code. For example, the processor 222 can be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 222 can be operatively coupled to the memory 224 through a system bus (for example, address bus, data bus and/or control bus). The processor 222 is configured to receive data communications from one or more compute devices such as the compute device 110 of OD system 100, the data communications including API requests or API calls directed to one or more destination servers such as the destination server 130. The processor 222 is configured to receive the communications, analyze the contents of the data communications, and/or route the data communications to the appropriate destination servers in conjunction with the communicator 226. The processor 222 is also configured to receive data communications from the destination servers, for example data communications with information requested in response to API calls from the compute devices, and the processor 222 is configured to analyze and/or route these communications to the appropriate compute devices.

In some implementations, the processor 222 is configured to extract information, from the routed data communications between the compute devices and the destination servers, analyze the information, maintain logs or schedules of the data communications, generate and send messages to the compute devices and/or the destinations servers, etc. as described in further detail herein. As illustrated in the schematic in FIG. 2, the processor 222 of the proxy server 220, can include a router 250, a data logger 251, a context analyzer 252, a machine learning model (also referred to as "ML model" herein) 253, an outlier detector 254, and a security enforcer 255, among other components, operatively coupled to each other.

The router 250 can be a hardware device or a software unit configured to route data communications between compute devices and destination servers. The router 250 can be configured to receive requests from a client application at a compute device, for example API based web applications, distributed applications and client server applications configured to use one or more security gateways (including servers, virtual machines and Linux containers) interposed between clients and destination servers for security at the API layer. The router 250 can receive data packets associated with a specific API and addressed to a target service at a destination server. The router 250 can transmit the data packets to the appropriate destination server based on predefined policies and techniques (e.g. security policies and techniques), via the communicator 226. In some implementations, the router 250 can be configured to parse the incoming data. The router 250 can be configured to route a copy of the received data to other components in the processor 222 such as the data logger 251, the context analyzer 252, and the security enforcer 255 for storage and analysis. In some implementations, the router 250 can selectively discard or reject transmission of communications/messages/traffic events that have been determined to be representative of a potentially malicious action/indicator of compromise, and only to allow transmission of communications/messages/traffic events that are found to be consistent with (or within established traffic parameter baselines for) normal traffic patterns associated with an API or application, based on inputs from the other components such as the security enforcer 255.

The data logger 251 can be configured to receive a copy of incoming data from the router 250 and log the data for reference. For example, the data logger 251 can use any suitable organizational structure or principle to log the data. In some instances, where the incoming data is encapsulated, the data logger 251 can be configured to parse the data into individual layers of encapsulation and suitably log data corresponding to one or more layers of interest. For example, in some embodiments, the data logger 251 can be configured to log data corresponding to Layer 7 or the Application layer, including information related to API traffic. In some other embodiments, as another example, the data logger 251 can log data corresponding to other layers such as the Layer 3 (Network Layer) or Layer 4 (Transport Layer), etc. In some instances, the data logger 251 can generate a database including several aspects of API traffic. For example, the data logger can generate a dictionary of API transactions that can be used by the components of the processor 222 to identify outlier data or potentially malicious actions, as described herein. In some instances, where a labeled or ground truth data may be available or used, the data logger may receive and log this ground truth data for future comparison against unknown API traffic data received from one or more compute devices or destinations servers. For example, the ground truth data can include API traffic data including a known malicious attack.

The processor 222 includes a context analyzer 252. The context analyzer 252 can be configured to receive a copy of the data received by the router 250 or the data logger 251 of the proxy server 220 and analyze the data including API traffic for context of one or more data API calls. For example the context analyzer 252 can be configured to parse real-time API traffic received from one or more compute devices or destination servers by extracting data associated with a predetermined set of data parameters stored in the memory 224. The data parameters can for example be selected based on their relevance to identifying specific indicators associated with the API traffic such as indicators of context of API calls, which may be used to identify other indicators of compromise corresponding to one or more APIs, etc., as described in further detail herein. In some embodiments, the data may be extracted from raw data logs or from data packets corresponding to real-time API traffic that is being received, using metadata formats such as (but not limited to) JSON, XML, text or binary format configurations. In some embodiments, the proxy server 220 may be configured to monitor a set of API calls associated with a set of APIs, and the context analyzer 252 can extract discrete sets of data parameters that may be selected corresponding to each API call from the set of API calls being monitored by the proxy server 220 based on the APIs with which they may be associated. In other words, data parameters can be selected for data extraction from raw data logs and/or from data packets corresponding to real-time API traffic that is being received, which in some instances, may depend on the API being monitored.

In some implementations, the context analyzer 252 can extract data based on data parameters selected based on API configurations and/or information associated with an API configuration. API configurations and associated information may be received by the proxy server 220 along with the data. In some embodiments, the context analyzer 252 can extract context based information from API traffic based on the protocol used for data transmission. For example, context information can be extracted from API traffic data associated with REST API, WebSocket, MQTT, AMQP, CoAP and any other application layer (layer 7) protocols. The associated API configuration(s) (for example, a JSON configuration) can include associated metadata for each raw data log.

The context analyzer 252 can analyze the extracted data to identify a sequence of API transactions. Sequencing of API transactions has a known start and end session, either using time-based logic or user-initiated authentication (e.g., user login/logout). The context analyzer 252 can define a set of symbols, the symbol being units of the data associated with the sequence of API transactions. The context analyzer 252 can further define a set of contexts based on the occurrence of the symbols. Each sequence can be defined with consistency of symbols in a context. The contexts can be dynamic and based on the applications. For example, the context analyzer 252 can extract a sequence of API calls (e.g., API Sequence S1={login, view account balance, view payee, initiate money transfer, validate transaction, store transaction number and logout}) associated with a particular API, and define symbols such that each API call in the sequence is associated with a different symbol. In some instances, the symbols may be defined based on the function of each of the API calls, the type of the API call, and/or the protocol associated with the API call. For example, an API call including a get request associated with a login via a HTTP protocol may be associated with a different symbol compared to an API call with a put request associated with a login via a HTTTPS protocol. In some implementations of the OD system including the proxy server 220, the symbols defined by the context analyzer 252 can be used as the bases for the dictionary of API transactions generated by the data logger 251 described above.

The context analyzer 252 can be configured to define a set of contexts, based on the information associated with each symbol (e.g., each API call in a sequence of API calls), such that the sequence of symbols can be analyzed for co-occurrence of symbols. The contexts can be defined based on the nature of the API calls, the functioning or configuration of the API, etc. Some example contexts can be the relative position of symbols (e.g., API calls) in a sequence of symbols. For example, a context of two positions of proximity can be defined such that the co-occurrence of a given symbol (A) with any other symbol (B) in the sequence, within two positions of proximity (e.g., either B following A or B preceding A within two positions of proximity) can be analyzed and/or measured. Another example of context can be the relative timing of symbols (e.g., API calls) received in a sequence of symbols (e.g., API calls). For example, a context of a time-window of 2 minutes can be defined such that the co-occurrence of a given symbol (A) with any other symbol (B) in the sequence, within a time-window of 2 minutes, can be analyzed and/or measured. Other example of position based contexts for analyzing co-occurrence of two symbols can be 1-position before, 2-positions before, 1-position after, 2-positions after, 1-position around, 2-positions around, etc. Tables 1-6 illustrates the definition of the above examples of position based contexts for symbols.

TABLE 1

| 1-Position Before | Value |
|---|---|
| $W_{-1,\,0}$(login) | { } |
| $W_{-1,\,0}$(view account balance) | {login} |
| $W_{-1,\,0}$(view payee) | {view account balance} |
| $W_{-1,\,0}$(initiate money transfer) | {view payee} |
| $W_{-1,\,0}$(validate transaction) | {initiate money transfer} |
| $W_{-1,\,0}$(store transaction number) | {validate transaction} |
| $W_{-1,\,0}$(logout) | {store transaction number} |

TABLE 2

| 2-Positions Before | Value |
|---|---|
| $W_{-2,\,0}$(login) | { } |
| $W_{-2,\,0}$(view account balance) | {login} |
| $W_{-2,\,0}$(view payee) | {login, view account balance} |
| $W_{-2,\,0}$(initiate money transfer) | {view account balance, view payee} |

TABLE 2-continued

| 2-Positions Before | Value |
|---|---|
| $W_{-2, 0}$(validate transaction) | {view payee, initiate money transfer} |
| $W_{-2, 0}$(store transaction number) | {initiate money transfer, validate transaction} |
| $W_{-2, 0}$(logout) | {validate transaction, store transaction number} |

TABLE 3

| 1-Position After | Value |
|---|---|
| $W_{-0, 1}$(login) | {view account balance} |
| $W_{-0, 1}$(view account balance) | {view payee} |
| $W_{-0, 1}$(view payee) | {initiate money transfer} |
| $W_{-0, 1}$(initiate money transfer) | {validate transaction} |
| $W_{-0, 1}$(validate transaction) | {store transaction number} |
| $W_{-0, 1}$(store transaction number) | {logout} |
| $W_{-0, 1}$(logout) | { } |

TABLE 4

| 2-Positions After | Value |
|---|---|
| $W_{-0, 2}$(login) | {view account balance, view payee} |
| $W_{-0, 2}$(view account balance) | {view payee, initiate money transfer} |
| $W_{-0, 2}$(view payee) | {initiate money transfer, validate transaction} |
| $W_{-0, 2}$(initiate money transfer) | {validate transaction, store transaction number} |
| $W_{-0, 2}$(validate transaction) | {store transaction number, logout} |
| $W_{-0, 2}$(store transaction number) | {logout} |
| $W_{-0, 2}$(logout) | { } |

TABLE 5

| 1-Position Around | Value |
|---|---|
| $W_{-1, 1}$(login) | {view account balance} |
| $W_{-1, 1}$(view account balance) | {login, view payee} |
| $W_{-1, 1}$(view payee) | {view account balance, initiate money transfer} |
| $W_{-1, 1}$(initiate money transfer) | {view payee, validate transaction} |
| $W_{-1, 1}$(validate transaction) | {initiate money transfer, store transaction number} |
| $W_{-1, 1}$(store transaction number) | {validate transaction, logout} |
| $W_{-1, 1}$(logout) | {store transaction number} |

TABLE 6

| 2-Positions Around | Value |
|---|---|
| $W_{-2, 2}$(login) | {view account balance, view payee} |
| $W_{-2, 2}$(view account balance) | {login, view payee, initiate money transfer} |
| $W_{-2, 2}$(view payee) | {login, view account balance, initiate money transfer, validate transaction} |
| $W_{-2, 2}$(initiate money transfer) | {view account balance, view payee, validate transaction, store transaction number} |
| $W_{-2, 2}$(validate transaction) | {view payee, initiate money transfer, store transaction number, logout} |
| $W_{-2, 2}$(store transaction number) | {initiate money transfer, validate transaction, logout} |
| $W_{-2, 2}$(logout) | {validate transaction, store transaction number} |

In some embodiments, the context analyzer 252 can be configured to generate a set of vector representations of the symbols based on the various context defined as described above. In some embodiments, the context analyzer 252 can use the sequence of symbols to generate a n-gram representation of the sequence of symbols (e.g. unigram, bigram, etc.) that can be provided as an input vector to a machine learning model (ML model) such as the ML model 253. In some embodiments, the context analyzer 252 can implement any suitable routine or analysis such as word-to-vector analyses to obtain vector representations of words to reconstruct linguistic contexts of words using word embedding. Word embedding routines can be implementations of analytical tools to obtain vector representations of words of natural language where words or phrases from a vocabulary (e.g., vocabulary used in API calls) are mapped to vectors of real numbers, using mathematical embedding from a representational space with one dimension per word to a continuous vector space with a much lower dimension.

In some implementations, the context analyzer 252 can be configured to generate an input vector based on the vector representation of the sequence of symbols to be provided to the ML model 253 such that the ML model 253 can identify based on the input vector, a potential malicious activity associated with a client application at a compute device from which the sequence of symbols are known to have originated. In other words, the ML model 253 can be trained on API transactions associated with largely normal user access patterns to applications that can be stored in a dictionary of API transactions (e.g., a dictionary of known associations between symbols). A potentially malicious pattern of activity can generate either a new sequence of symbols or a combination of new sequences of symbols of API transactions that can be identified as an outlier and be flagged as being indicative of malicious activity. For example, the context analyzer 252 can generate a representation of an indication associated with at least one API call from a sequence or set of API calls (defined based on a context for example) to provide as input to the ML model 253 to identify potentially malicious activity associated with a client device, as described herein.

The ML model 253 can be any statistical model built and trained using machine learning tools. In some embodiments the ML model 253 can be a supervised model. In some other embodiments, the ML model 253 can be built and used in an unsupervised manner. For example, the ML model 253 can be a neural network model, a random forest model, a decision tree model, a Bayesian network model, a clustering model, a Gaussian mixture model, or any statistical model that can be used for statistical testing such as hypothesis testing.

The ML model 253 can be trained using suitable procedures such that during testing the ML model 253 can detect outliers in the API traffic data based on which a potential source of malicious activity can be identified. For example, in implementations where the ML model 253 is a supervised model, a set of ground truth data containing no outliers that may correspond to potentially malicious activity can be used to train the ML model 253. As another example, in implementations where the ML model 253 is a supervised model a set of API traffic data that includes known data associated with a known malicious attack can be used to train the ML model 253 to detect outliers that may be associated with malicious activity. In some implementations where the ML model is an unsupervised model the ML model 253 can be trained to build rich databases or data tables with majority of the data corresponding to normal API traffic including no malicious activity. In some such implementations where the ML model 253 is an unsupervised model the ML model 253 can learn associations and build a dictionary of API transactions associated with each API encountered. The ML model 253 can be configured to learn associations irrespective of the type, domain or configuration of an API, for example spanning e-commerce transactions and banking transactions. The ML model 253 can capture normal API transaction data across multiple contexts such that outliers can be detected even in sophisticated attacks involving API transactions that may be noticeable as anomalous only across multiple transactions spanning multiple contexts.

In some implementations of the proxy server 220 in an OD system, the machine learning model (ML model) 253 can be configured to receive as input a vector representation of at least a portion of API traffic data defined by symbols as described herein and identify based on the input whether the client or compute device that is associated with the origin of the API traffic data is acting in a malicious manner. For example, the proxy server 220 can receive a sequence S1 of API calls. The ML model 253 can receive an indication of at least one API call in the sequence S1 of API calls (also referred to herein as symbols) and predict a sequence of API calls P1 expected to be associated with the indication of the at least one API call provided as input, under normal conditions of API traffic. In such implementations the predicted sequence P1 of API calls can be used, for example, to generate suitable analytical measures that can be compared with analogous measures generated from the actual sequence of API calls S1. In some implementations, the ML model 253 can receive an indication of at least one API call in the sequence S1 of API calls and predict a set of parameters associated with a set of likely subsequent API calls P1. In some such implementations, the ML model 253 can be provided an input of a second API call received from the client device and the ML model 253 can identify the set of parameters including a predicted number of API calls between the first API call and the second API call. In some implementations the set of parameters identified by the ML model 253 can include a predicted time period between the first API call and the second API call.

The outlier detector 254 can receive the outputs of the ML model 253 and compute the suitable metrics that can be used to detect outliers in the API traffic data. As an example metric, co-occurrence counts can be calculated as a measure of likelihood of co-occurrence of any two symbols (e.g., API calls) within a sequence. Co-occurrence counts can allocate value to a pair of symbols based on the expected co-occurrence of the pair of symbols derived from baseline data. Co-occurrence counts can be calculated across multiple different contexts. Table 7 illustrates an example set of co-occurrence counts generated across different context for various pairs of example API calls in a sequence of API calls. Co-occurrence counts calculated across various contexts can be combined using any suitable method including methods like max-pooling. In some instances the baseline data can be data collected and accumulated during training of the ML model 253, that can be an unsupervised model, forming a dictionary of symbols (e.g., a dictionary of API transactions described above). In some instances the baseline data can be data used during training of the ML model 253, which can be a supervised model, where the baseline data can be derived from labelled data, ground truth data or data associated with a known malicious attack as described previously.

TABLE 7

| Transaction Pairs | Count |
|---|---|
| $\text{co-occur\_count}_{-1,0}$(login, view account balance) | 0 |
| $\text{co-occur\_count}_{0,2}$(login, view account balance) | 1 |
| $\text{co-occur\_count}_{0,2}$(login, view payee) | 1 |
| $\text{co-occur\_count}_{0,2}$(login, initiate money transfer) | 0 |
| $\text{co-occur\_count}_{1,1}$(validate transaction, store transaction number) | 1 |
| $\text{co-occur\_count}_{2,2}$(validate transaction, logout) | 1 |

As another example, consistency scores can be calculated for pairs of symbols in a sequence (e.g., API calls in a sequence of API calls) based on co-occurrence counts. Consistency scores can be computed using Normalized Pointwise Mutual Information (npmi) based on co-occurrence scores, such that consistency scores gives strength of co-occurring symbols. In some embodiments, consistency scores can be calculated by incorporating suitable weighting coefficients associated with the different contexts. For example, in instances that use position-based contexts, the contexts that include positions further away from the symbol being analyzed (e.g., API calls positioned further away from an API call being analyzed) can be associated with lesser weights than symbols positioned closer to the symbol being analyzed. As an example, a context of proximity by 2 positions can be weighted higher than a context of proximity by 5 positions. The weighting coefficients can be selected in any suitable manner. For example weighting coefficients can be user determined, determined from data obtained during training phase (e.g., a labelled data used for a supervised ML model or derived from statistical estimates from majority data used with unsupervised ML models). In some instances the weighting coefficients can be derived from a function such as an exponentially decaying function with increase in relative distance between two symbols in a sequence.

Co-occurrence counts and/or consistency scores calculated for pairs of API calls in an actual sequence of API calls S1 received from a client device can be compared to co-occurrence counts calculated for pairs of API calls in a predicted sequence of API calls P1. For example, low co-occurrence counts or low consistency scores can be indicative of anomalous activity. In some embodiments, the outlier detector 254 can define predetermined thresholds or boundary conditions as criteria of similarity between the predicted values and the actual values (e.g., co-occurrence counts). Based on the comparison, in instances where the two sets of co-occurrence counts do not match or lie within predefined bounds or predefined criteria of each other, the outlier detector 254 can be configured to return a flag alerting the processor 222 of the proxy server 220 of a potentially malicious activity associated with the API traffic being analyzed.

The security enforcer 255 can be configured to receive output of the outlier detector 254 and determine handling of API traffic from a set of compute devices or destination servers. For example, in some embodiments, the security enforcer 255 can be configured to respond to a positive detection of potentially malicious activity by the outlier detector 254 by partially or completely restricting transmission of data from and/or to a compute device or a destination server associated with the potentially malicious activity. In some other embodiments, the security enforcer 255 can be configured to send alerts or messages, via the communicator 226, to the destination server based on detection maliciousness from the compute device or send alerts or messages, via the communicator 226, to the compute device based on detection of maliciousness from the destination server. In some embodiments the security enforcer 255 can be configured to collect data associated with a potentially malicious activity and perform additional analyses. In some embodiments, the security enforcer 255 can be configured to send the collected data associated with the potential malicious activity and the results of any analyses to a third party device.

Figure 3:
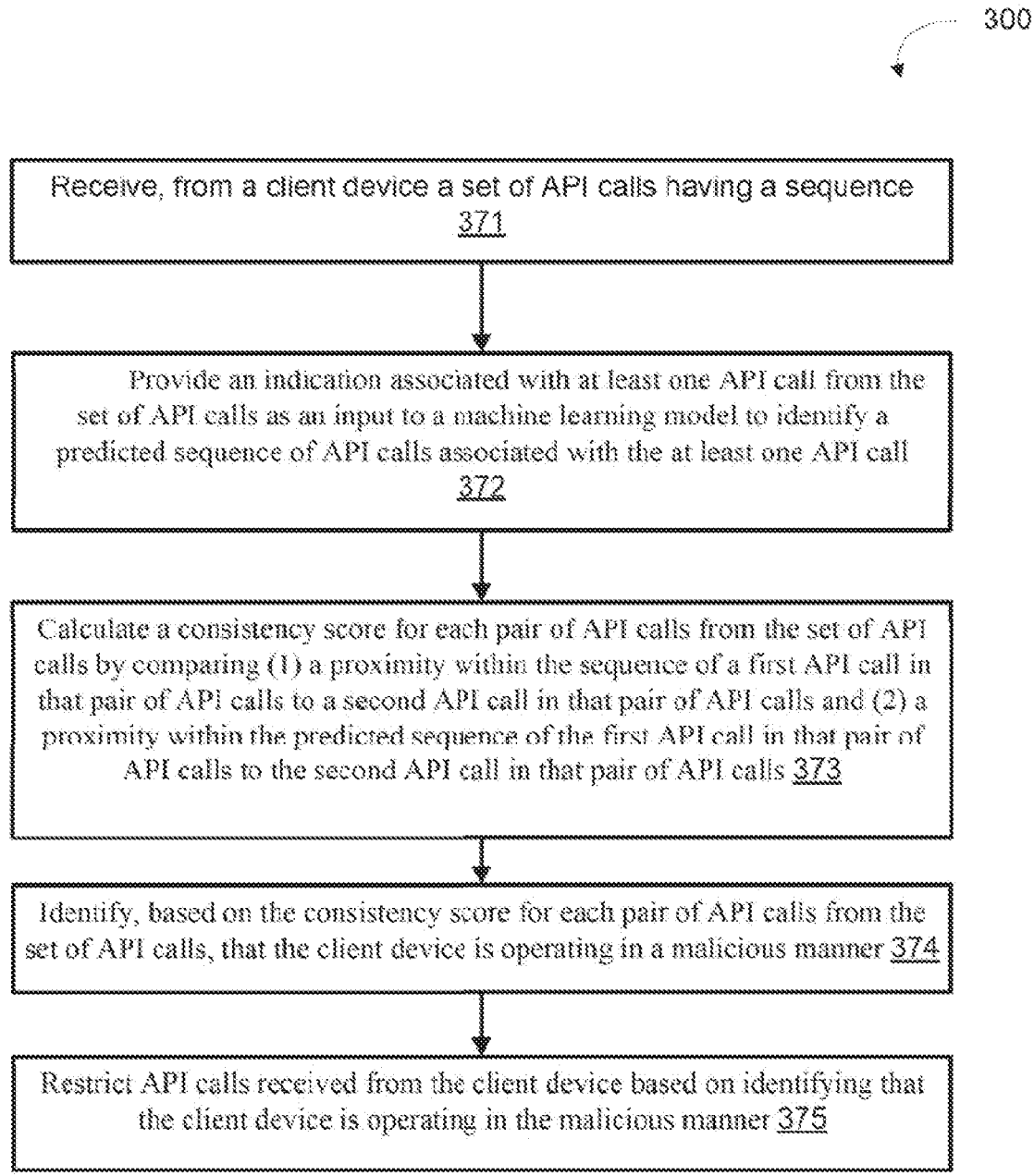
FIG. 3 is a flowchart for using a machine learning (ML) model included in a proxy server of an OD system, according to an embodiment.

In use, a proxy server such as the proxy server 220 can thus be used to identify potentially malicious activity and respond to the identification in a suitable manner. FIG. 3 is a flow chart illustrating an example method 300 of using an OD system including a proxy server such as the proxy server 220 or 120 described above, to identify a client device that is operating in a malicious manner.

At 371 the proxy server can receive, from a client device, a set of API calls having a sequence. At 372, the proxy server can provide an indication associated with at least one API call from the set of API calls as an input to a machine learning model, such as the ML model 253 described above, to identify a predicted sequence of API calls associated with the at least one API call. At 373, the proxy server can calculate a consistency score for each pair of API calls from the set of API calls by comparing (1) a proximity within the sequence of a first API call in that pair of API calls to a second API call in that pair of API calls and (2) a proximity within the predicted sequence of the first API call in that pair of API calls to the second API call in that pair of API calls.

At 374, the proxy server can identify, based on the consistency score for each pair of API calls from the set of API calls, that the client device is operating in a malicious manner. At 375, the proxy server can restrict API calls received from the client device based on identifying that the client device is operating in the malicious manner.

Figure 4:
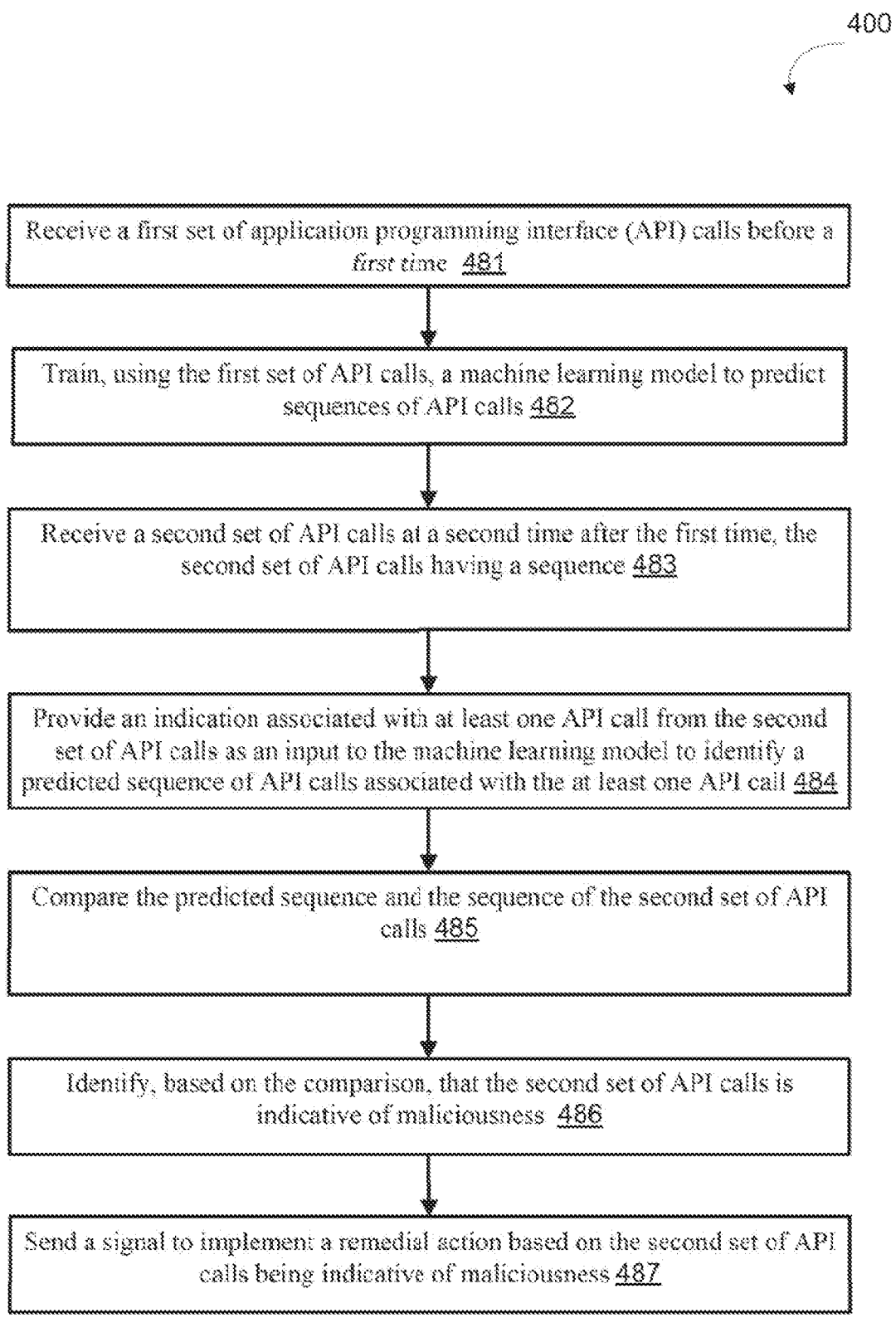
FIG. 4 is a flowchart for training and using a ML model included in a proxy server of an OD system to detect potential malicious actions, according to an embodiment.

FIG. 4 is a flowchart illustrating an example method 400 of training and using a ML model in a proxy server (e.g., the ML model 253 of the proxy server 220) to identify a set of API calls as being indicative of maliciousness and responding to the identification by sending a signal for remedial action. At 481, the method involves receiving, at a processor of a server (e.g., the proxy server 220 or the proxy server 120), a first set of API calls before a first time. The processor is configured to train, at 482, using the first set of API calls, a machine learning model to predict sequences of API calls.

At 483, the method includes receiving at the processor of the server, a second set of API calls at a second time after the first time, the second set of API calls having a sequence. At 484, the method 400 includes providing an indication associated with at least one API call from the second set of API calls as an input to the machine learning model to identify a predicted sequence of API calls associated with the at least one API call.

At 485, the method includes the processor comparing the predicted sequence and the sequence of the second set of API calls. At 486, the method includes the processor identifying based on a comparison between the predicted sequence and the sequence of the second set of API calls, that the second set of API calls is indicative of maliciousness. At 487, the method includes the processor sending a signal to implement a remedial action based on the second set of API calls being indicative of maliciousness. Example remedial actions can include blocking all further API traffic associated with the source of the second set of API calls being indicative of maliciousness, setting restrictive filters for receiving and/or transmitting further API calls associated with the source of the second set of API calls being indicative of maliciousness, sending alerts or error messages to a destination server indicating the source of the second set of API calls being indicative of maliciousness, preparing and sharing a report of data associated with the source of the second set of API calls being indicative of maliciousness, with a destination server or a third party, for forensic analysis, documenting activity patterns associated with the source of the second set of API calls being indicative of maliciousness for analyses, and the like.

Some embodiments of systems, apparatuses and methods described herein include a proxy server including a machine learning model that is configured such that the ML model predicts an expected sequence of symbols or API calls that can be compared against a sequence of API calls received by the proxy server, using metrics such as co-occurrence counts and consistency scores, to identify outlier or anomalous activity that can associated with potential malicious actions. Other embodiments of systems, apparatuses, and/or methods can include other variations of implementing the above described procedures. For example, in some embodiments, the ML model can be configured to receive as input a vector representation (e.g., an n-gram representation) of two or more symbols in a sequence of symbols the symbols being API calls. The ML model can be configured to predict an expected relative proximity or relative position of the symbols in a typically normal transaction based on baseline data. For example the ML model can be trained to predict an expected number of API calls between the first API call and the second API call in a pair of API calls in the input. The predicted proximity or predicted number of intervening calls can be compared against the actual proximity in the sequence of API calls received, and based on the comparison the outlier detector and/or the security enforcer can identify one or both of the API calls as anomalous and indicative of potentially malicious activity.

As another example, in some embodiments, the ML model can be configured to receive as input a vector representation of a sequence of symbols, the symbols being API calls. The ML model can be configured to calculate and output the co-occurrence scores for every possible pair of API calls in the sequence of API calls according to various contexts. The co-occurrence scores associated with a single symbol or a single API call can then be combined, for example by the outlier detector, to generate consistency scores associated with single API calls that can be compared against baseline values of consistency scores for API calls occurring in sequences of normal activity (e.g. good sequences). For example, if the consistency scores associated with one or more API calls in an analyzed sequence (received from a client device) are found to be below a predetermined threshold, the threshold being determined based on baseline data collected during training, the outlier detector can report or return an outlier indicating anomalous activity. This report can be acted upon, for example by the security enforcer, by sending a signal for remedial action, such as restricting traffic to/from the suspected client device or collecting and analyzing data associated with the potential malicious activity and sending the data and analyses to a destination server or a third party for forensic analysis, etc.

In some other embodiments the proxy server can be configured such that the ML model is trained to receive as input a vector representation of a sequence of symbols (e.g. API calls) and generate an output of consistency scores such that each consistency score is associated with each symbol in the sequence. The consistency scores can reflect the co-occurrence strength of multiple pairs of symbols including the associated symbol, combining several contexts. The consistency score can then be used by the outlier detector and/or the security enforcer to identify anomalous API calls based on comparison against a predetermined threshold and to act upon the identification to seek remedial action. In some other embodiments, the proxy server can be configured such that the ML model is trained to directly output whether one or more symbols in a sequence of symbols (e.g., one or more API calls in a sequence of API calls) are detected to be anomalous and indicative of potential malicious activity. In some other embodiments, the proxy server can be configured such that the ML model is trained to directly output an identification and a classification of type of maliciousness of activity associated with a sequence of symbols.

In some embodiments, the ML model can be configured to generate and update a dictionary of symbols and the associated patterns of normal transactions involving the symbols, for example, a dictionary of API transaction arising from normal activity. The ML model can begin with an empty dictionary before training and developing the dictionary for each application or across application during training. During training, the ML model can learn the co-occurrence strength expected for each pair of API transactions encountered for a particular application during normal patterns of activity, for example. In some embodiments, the ML model can be unsupervised and detection of anomalous symbols that may be indicative of malicious activity can be completely automated. In some other embodiments, the detection of anomalous symbols that may be indicative of malicious activity can be supervised and curated. While the metrics defined herein (e.g., co-occurrence counts, consistency scores) to measure and identify anomalous occurrence of symbols (e.g., API calls) are based on measuring strength of associations between pairs of symbols, other embodiments may use measures of strength of higher order associations such as triplets, quadruplets, quintuplets, and/or the like.

As described above, the identification of one or more symbols (e.g., API calls) as an anomaly can be based on measures of strength of associations between multiple symbols across multiple contexts (e.g., various positional, temporal contexts). In some embodiments, the measures of strength of associations can be combined with other metrics such has time of receiving the API calls, number of API calls, location of the client device, a type of the client device, an application sending the set of API calls, a user associated with a client device, a number of API calls received from the client device within a predefined time period, a type of payload of at least one API call from the set of API calls, a time at least one API call from the set of API calls is received from the client device, or a day at least one API call from the set of API calls is received from the client device. Some other example metrics can be whether the API calls are originating from a single application or multiple applications at the client device, whether the API calls are originating from a single client device or multiple client devices, whether the API calls are directed to a single destination server or multiple different destination servers, etc.

The systems, and methods described herein can be used for applications with one or more APIs and located in a public or private cloud or in one or more private datacenters. The systems, and methods described herein can be used across applications supporting single sign-on sessions in clouds or datacenters. The systems and methods described herein can be dynamic and continuously evolving with accumulation of data related to API transactions for a single application or across multiple applications. The systems and methods described herein can be applied to applications, such as web applications, service oriented architecture (SOA), web services, micro services, and others.

In some implementations, the systems and methods described herein can implement suitable parallelization or distributed processing methods to circumvent or resolve potential bottlenecks arising from the immense quantity of data associated with API transactions also referred to as a big data challenge. To improve efficiency and reduce time for training, calculating co-occurrence counts of symbols across multiple contexts during training can be learned using map-reduce paradigm. For example, map function can be used to analyze symbol pair associations within one context, and reduce function can be used to aggregate the analyses specific to each context to generate a combined consistency score across all contexts. This way a proxy server and a ML model in an OD system can handle very large data sets, during both training periods and during prediction or implementation periods.

An example analysis of a normal sequence of transactions and an abnormal sequence of transactions indicative of potentially malicious activity, are described below. An example normal or non-malicious sequence can be:
Session 1=(login, view account balance, view payee, initiate money transfer, validate transaction, store transaction number and logout)
An example of abnormal or malicious sequence can be:
Session 2=(initiate money transfer, initiate money transfer, initiate money transfer, system error with no balance).

In the above sequences, session 1 can be considered normal or non-malicious because of a high co-occurrence score calculated for each transaction in the sequence. However, session 2 can be considered anomalous or malicious because of the low score for co-occurrence of "initiate money transfer" from appearing multiple times in a sequence and a unique "system error with no balance" symbol in the sequence.

Examples of symbols that can be included in the dictionary for the above application can include login, view account balance, view payee, initiate money transfer, store transaction number, logout, and system error with no balance. Tables 1-6 above show example co-occurrence counts calculated for pairs of symbols in the Session 1 sequence across multiple contexts. The session 1 position-based context tables (e.g. 1—Position Before, 2—Positions Around) can be used to generate co-occurrence counts by counting the frequency of a transaction pair consisting of a symbol and a value. For example, the 2-Positions after Table (0, 2) shows that a login request is followed by view account balance and view payee. Thus, cooccurrence_count0, 2 (login, view account balance) and co-occurrence_count0, 2 (login, view payee) both have a count of 1. The co-occurrence count of any other symbol that is not within two positions of login is 0; for example, co-occurrence_count0, 2 (login, initiate money transfer) is 0.

Co-occurrence counts can be calculated for each pair of transactions in the dictionary for all contexts defined above.

The co-occurrence counts for a few transaction pairs based on session1 (login, view account balance, view payee, initiate money transfer, validate transaction, store transaction number and logout) are listed in Table 7 above. In some implementations of the methods described herein, co-occurrence counts calculated per context can be used to calculate consistency scores that are aggregated in a co-occurrence consistency matrix also referred to as a consistency matrix. Co-occurrence scores associated with a single symbol or pair of symbols, generated across multiple contexts, can be used to evaluate the co-occurrence consistency matrix for that symbol or pair of symbols. Table 8 below illustrates an example co-occurrence consistency matrix with co-occurrence counts calculated across six different example contexts for two example pairs of symbols. The co-occurrence consistency matrix in Table 8 uses the scores from all contexts in the above example to compare scores of login followed by account balance versus login followed by initiate money transfer. For this example, the login, initiate money transfer has a much lower score and is more likely to be an attack.

TABLE 8

|  | Login, View Account Balance | Login, Initate Money Transfer |
|---|---|---|
| $\text{co-occur\_count}_{1,0}$ | 0 | 0 |
| $\text{co-occur\_count}_{2,0}$ | 0 | 0 |
| $\text{co-occur\_count}_{0,1}$ | 1 | 0 |
| $\text{co-occur\_count}_{0,2}$ | 1 | 0 |
| $\text{co-occur\_count}_{1,1}$ | 1 | 0 |
| $\text{co-occur\_count}_{2,2}$ | 1 | 0 |
| Score | 4 | 1 |

For time-based T-contexts, a pair of transactions within a T-second window have a co-occurrence score. For example, "T, T-context" is the set of all transactions in that session that occurred within T seconds of the target transaction. The co-occurrence consistency of a transaction pair can be a function of the co-occurrence count of the transaction pair across the entire sequence within a context. Multiple contexts can be defined and used to enhance the prediction accuracy of the ML model. Starting with position-based and/or time-based contexts, a complex combination of the contexts can be defined for better insight into outlier detection. Max pooling methods can be used to calculate the consistency score.

During the detection period, any new transaction activity can be evaluated by calculating the co-occurrence counts based on the developed tables and then generating a co-occurrence consistency score. The consistency of a transaction within a context with respect to baseline data can be identified. The system can compute a transaction co-occurrence score based on the consistency score and the context. If the score falls below a threshold, the sequence can be flagged as malicious or as an attack.

In some embodiments, the systems and methods described herein can include additional components used for managing API transactions. For example in some embodiments the proxy server of an OD system can implement automatic URL detection. Using this implementation the system automatically learns valid URLs for a given API and then measures the number of requests/responses for each valid URL. The metric for each valid URL can include URL name, Total request count, and Total request count per protocol method. In some embodiments the proxy server of an OD system can implement Multi-Dimensional Analysis for Attack Detection (MDAAD), for example using the outlier detector described above. A key challenge for security products can be minimizing false positive results that occur when a security system identifies acceptable usage as an attack. To reduce false positives, a system analyzes inputs from multiple sources and then accurately categorizes results. An example of categorizing results is designating an activity as, but not limited to, an attack, anomaly, or acceptable usage. Multi-Dimensional Analysis for Attack Detection (MDAAD) can be used to provide a mechanism for multi-dimensional analysis of variables that can be used accurately to categorize output. A MDAAD Table can be a system that 1) categorizes results using variables from multiple sources, 2) develops permutations of input values, and 3) generates outcomes based on analyzing the permutation. Table 9 below lists some example MDAAD elements.

TABLE 9

|  | Data Source 1 | Data Source 2 | . . . | Data Source m | Outcome |
|---|---|---|---|---|---|
| Permutation 1 | DS1 Variable 1 | DS2 Variable 1 |  | DSm Variable 1 | Outcome A |
| Permutation 2 | DS1 Variable 2 |  |  |  | Outcome B |
| Permutation 3 | DS1 Variable 3 | DS2 Variable 2 |  | DSm Variable 1 | Outcome A |
| Permutation 4 |  | DS2 Variable 3 |  | DSm Variable 2 | Outcome C |
| . . . |  |  |  |  |  |
| Permutation n |  |  |  | DSm Variable n | Outcome N |

MDAAD elements can include Multiple Data Sources. Table 9 shows unique Data Source listed in the top row of the MDAAD Table. Data Sources can include for example a score, a threshold, geolocation of the source of traffic, the datacenter of origin for that traffic, the device type used to access the API, the client machine used, the client machine environment and application used, or amount of traffic, payload type, protocol used, commands used, time of the day, different days in a week, holidays, vacations, different seasons in a year, impact of global events on the API, etc. Each Data Source can be included in a separate column in the MDAAD Table. Examples of Data Source Variables include a machine learning algorithm (e.g., K-means, GMM, and Binning) threshold with values based on histogram percentile. In some implementations the MDAAD can used in conjunction with the ML model described above, such that a consistency score derived from the ML model can be used as one or the data sources. In some other embodiments, a proxy server can use MDAAD implementation without a ML model (e.g., a proxy server lacking a ML model). Examples of different variable values include Very low—less than 5th percentile, Normal—greater than 5th percentile, but less than or equal to 90th percentile, High—above 90th percentile, and Very High—above 99th percentile.

Each value can be added to the MDAAD Table to allow different values of a given variable to influence the outcome. MDAAD implementations can use permutations (e.g., permutations of data source variables). Table 9 includes MDAAD Table rows having unique Permutations of Data Source Variables (also called "labels"). Examples of different Variable values can include the following. Each row can have a unique combination of Data Source Variable values—a single Data Source Variable Value in each column, each row can have a mixture of Data Source Variable values and blank values. For blank values, the MDAAD implementation can be configured such that the corresponding Data Source Variable does not influence the outcome for that permutation. Each row can have one or more Data Source Variables with multiple values in a single column. Data Source Variables can produce unique permutations when combined with other variables to avoid ambiguous results.

MDAAD implementations can include output categorization. The MDAAD implementation can list the permutations that create output categorization that can be used to determine a remedial action (e.g., suspected of identified malicious activity, identified anomaly, etc.) and not other permutations. In some implementations, each MDAAD Table Outcome can be derived from the Permutation of Data Source Variables. In some implementations, each Permutation can generate a single outcome. This outcome does not have to be unique across all Permutations. 1-dimensional, 2-dimensional, or higher dimensional models can generate outcomes using the MDAAD Table process.

Table 10 below includes an example of a 2 dimensional model using a MDAAD implementation Table to generate 3 or more outcomes such as ok, anomaly, or attack, but is not limited to just these 3 types of outcomes.

TABLE 10

| Data Source 1 | Data Source 2 | Outcome |
| --- | --- | --- |
| Very High | | Malicious Action |
| High | High | Malicious Action |
| High | Normal | Anomaly |
| Normal | | OK |

The permutations in Table 10 include the following. Permutation 1—When the first Data Source Variable value is Very High, the MDAAD Table generates an attack regardless of the second Data Source Variable value. Permutation 2—When both the first and second Data Source Variables are High, the MDAAD Table generates an attack. Permutation 3—When the first Data Source Variable value is High and the second Data Source Variable is Normal, the MDAAD Table generates an anomaly. Permutation 4—When the first Data Source Variable value is Normal, the MDAAD Table generates an ok regardless of the second Data Source Variable value.

The implementation of MDAAD Tables, in some instances, can support quick processing of a large multi-dimensional set of inputs and produce categorized outputs with high granularity. MDAAD tables can be expanded to analyze additional Data Source Variables and/or Permutations and generate accurate and/or categorized outcomes.

Figure 5:
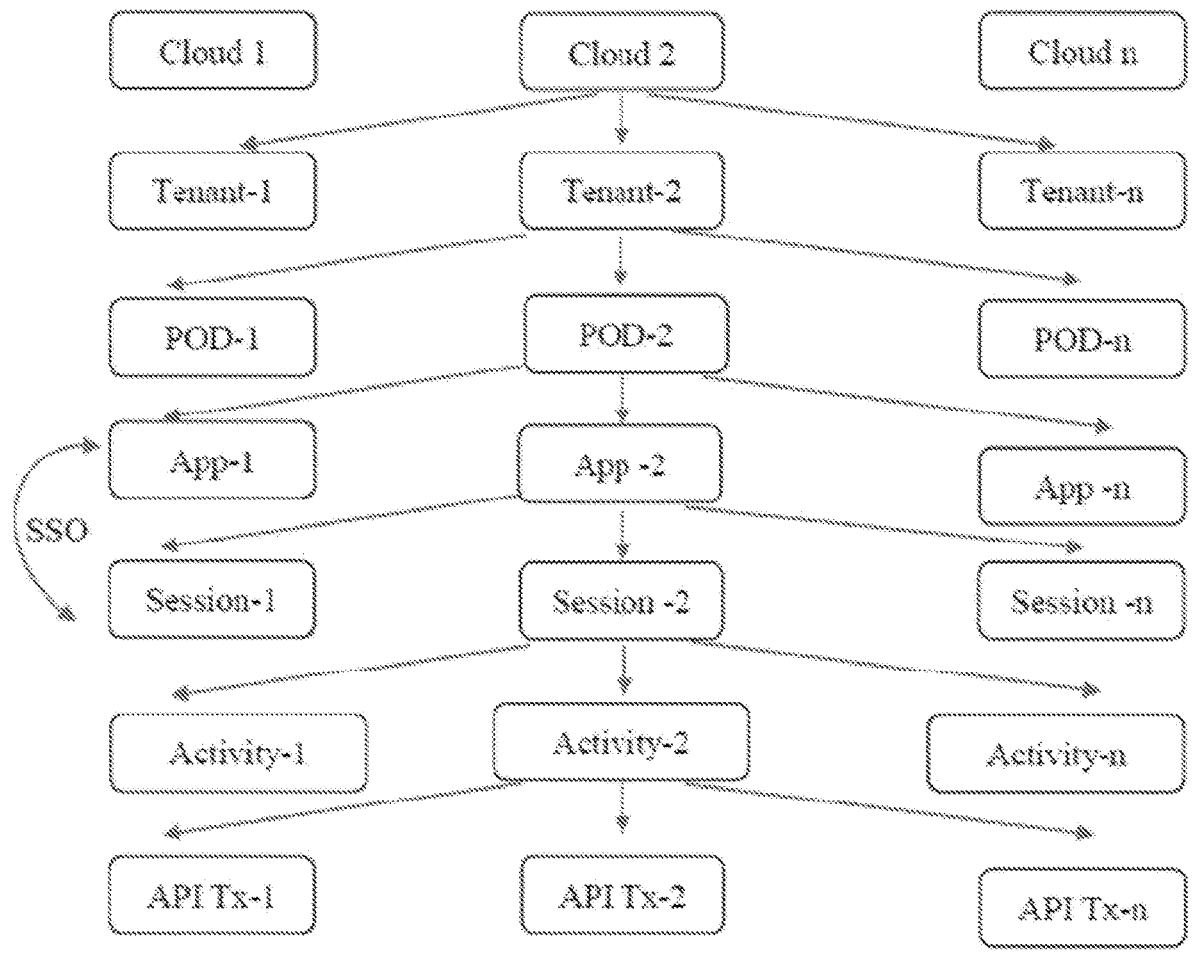
FIG. 5 is a schematic representation of a multi-level sequencing model including multiple hierarchical levels of implementation of API based activity, according to an embodiment.

As described previously, the systems and methods described herein can be used to detect anomalies in transactions spanning multiple hierarchical levels of operation of applications, using outlier detection in multi-level sequencing. FIG. 5 illustrates a multi-level hierarchy across which the outlier detection system described herein can be implemented. FIG. 5 shows an example deployment of modern applications in a public cloud, or datacenters. The hierarchical organization illustrates an example where a single cloud can support multiple tenants, each tenant supporting several points of deployment (PODs). Each POD can support several Applications or Apps and each App can include several sessions of usage each session having a Single Sign-On (SSO) type of operation. Each session can include a user engaging in several activities, and each activity can invoke multiple API support request through multiple unique API transactions. The systems and methods described herein can support API transactions that support the illustrated multi-level, cross-hierarchy implementation of applications. Some embodiments of the system and methods described herein are with reference to applications invoking API support, and involve analysis of data from Layer 7 API traffic running in a POD inside a single or multi-tenant cloud or data center environment. In some instances, the infrastructure services including a cloud region to a tenant to a POD can be the underlying context for the applications and Layer 7 API traffic.

Contexts can be defined for each hierarchical organization. For example, one hierarchical context can include API transmissions under (Cloud 2-, Tenant-2, POD-2, App-2, Session-2, -Activity-2) while another hierarchical context can include API transmissions under (Cloud 2-, Tenant-2, POD-2, App-2, Session-2, -Activity-1). Each organization can have a set of contexts defined that apply to that organization. What may be considered normal or baseline pattern of API traffic according to one hierarchical context can be detected as an outlier for another. For example what is considered a normal activity pattern in one cloud region may not be normal in another cloud region. As another example, a peak traffic during Christmas time in an e-commerce server in the US region may be considered normal but the same type of activity pattern in India may be not normal during the same period. Such definitions of contexts depending on hierarchies across multiple levels can be used when generating sequences across many levels to find outliers that may be indicative of potential malicious activities.

In some instances of implementing the OD system and/or methods described herein, once a suspected anomalous or suspected malicious activity associated with an API call is identified, various features associated with the anomalous API traffic detection can be extracted at suitable time intervals (e.g., anything from a fraction of a second to an annual basis). In some embodiments, the proxy server and/or the ML models can be built to output results for API visibility, API anomalies, API attacks, backend errors and blocked connections (e.g., connections that are blocked by an API security front-end proxy or security server). The aggregate summary and details of all flagged and/or blocked connections can be reported on a per-API basis, for recording violations such as methods, content types, and protocol mismatch, and also for blocked malicious actions, etc.

Systems and methods are described herein for analyzing API traffic to identify potential malicious actions within a smart outlier detection system.

As used in this disclosure, "server" can refer to any device having information processing and network communication capabilities, and which is configured to provide one or more services to a requesting client, over a communication network. The types of servers can vary widely, and include but are not limited to API servers, application servers, micro services, web servers, FTP servers, IOT brokers or gateways, message brokers, or service oriented architecture (SOA) servers.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

Although various embodiments have been described as having particular features and/or combinations of components, other embodiments are possible having a combination of any features and/or components from any of embodiments as discussed above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

In this disclosure, references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. The use of any and all examples, or exemplary language ("e.g.," "such as," "including," or the like) provided herein, is intended merely to better illuminate the embodiments and does not pose a limitation on the scope of the embodiments or the claims.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The invention claimed is:

1. A non-transitory processor-readable medium storing code representing instructions to be executed by a processor, the code comprising code to cause the processor to:
   receive, at a first time, a first application programming interface (API) call in a sequence of API calls, the first API call addressed to an API;
   receive, at a second time, a second API call in the sequence of API calls;
   predict a predicted time period between the first API call and the second API call;
   compare the predicted time period with an actual time period between the first time and the second time to generate a consistency score; and
   perform a remedial action associated with the sequence of API calls when the consistency score does not meet a criterion.

2. The non-transitory processor-readable medium of claim 1, further comprising code to cause the processor to:
   route the first API call to a server associated with the API when the consistency score meets the criterion.

3. The non-transitory processor-readable medium of claim 1, wherein the code to cause the processor to predict includes code to cause the processor to predict the predicted time period by providing a representation of at least one of the first API call or the second API call as an input to a machine learning model to identify the predicted time period.

4. The non-transitory processor-readable medium of claim 1, wherein the second API call in the sequence of API calls is addressed to the API.

5. The non-transitory processor-readable medium of claim 1, wherein the API is a first API and the second API call in the sequence of API calls is addressed to a second API different from the first API.

6. The non-transitory processor-readable medium of claim 1, wherein the remedial action includes at least one of preventing the first API call from being sent to a server associated with the API, blocking API calls associated with a source of the first API call, setting restrictive filters associated with the source of the first API call, sending an alert to the server associated with the API, or storing activity patterns associated with the source of the first API call.

7. The non-transitory processor-readable medium of claim 1, wherein the first API call is received from a first client device and the second API call is received from a second client device different from the first client device.

8. A method, comprising:
   receiving, at an application programming interface (API) gateway and from a client device, a set of API calls having a sequence and addressed to an API from a plurality of APIs associated with the API gateway;

predicting a predicted proximity between a first API call from the set of API calls and a second API call from the set of API calls;

generating a consistency score by comparing the predicted proximity with an actual proximity in the sequence between the first API call and the second API call; and sending the set of API calls to a server associated with the API when the consistency score meets a criterion.

9. The method of claim 8, wherein the predicting includes:
providing as an input to a machine learning model a representation of the first API call; and
receiving, as an output from the machine learning model, an indication of the predicted proximity between the first API call and the second API call.

10. The method of claim 8, further comprising:
preventing the set of API calls from being sent to the server when the consistency score does not meet the criterion.

11. The method of claim 8, wherein the actual proximity is a number of API calls in the sequence between the first API call and the second API call.

12. The method of claim 8, wherein the actual proximity is a time period in the sequence between the first API call and the second API call.

13. A non-transitory processor-readable medium storing code representing instructions to be executed by a processor, the code comprising code to cause the processor to:
receive, at a proxy server and from a client device, a set of instructions having a sequence and addressed to a destination server from a plurality of destination servers associated with the proxy server;
provide as an input to a machine learning model a representation of a first instruction from the set of instructions;
receive, as an output from the machine learning model, an indication of a predicted proximity between the first instruction and a second instruction from the set of instructions;
compare the predicted proximity with an actual proximity in the sequence between the first instruction and the second instruction to generate a consistency score; and
perform a remedial action associated with the set of instructions when the consistency score does not meet a criterion.

14. The non-transitory processor-readable medium of claim 13, further comprising code to cause the processor to:
send the set of instructions to the destination server when the consistency score meets the criterion.

15. The non-transitory processor-readable medium of claim 13, wherein the remedial action includes at least one of preventing the set of instructions from being sent to the destination server, blocking instructions associated with the client device, setting restrictive filters associated with the client device, sending an alert to the destination server, or storing activity patterns associated with the client device.

16. The non-transitory processor-readable medium of claim 13, wherein the actual proximity is a number of instructions in the sequence between the first instruction and the second instruction.

17. The non-transitory processor-readable medium of claim 13, wherein the actual proximity is a time period in the sequence between the first instruction and the second instruction.

18. The non-transitory processor-readable medium of claim 13, further comprising code to cause the processor to:
generate an n-gram representation of the first instruction to define the representation of the first instruction.

19. The non-transitory processor-readable medium of claim 13, wherein the machine learning model includes at least one of a neural network, a decision tree model, a random forest model, a Bayesian network or a clustering model.

20. The non-transitory processor-readable medium of claim 13, wherein the first instruction is a first application programming interface (API) call and the second instruction is a second API call.

* * * * *